United States Patent [19]
Oha

[11] Patent Number: 5,202,670
[45] Date of Patent: Apr. 13, 1993

[54] IMAGE PROCESSING APPARATUS

[75] Inventor: Shinichi Oha, Tokyo, Japan

[73] Assignee: Canon Kabushiki Kaisha, Tokyo, Japan

[21] Appl. No.: 836,162

[22] Filed: Feb. 14, 1992

Related U.S. Application Data

[63] Continuation of Ser. No. 517,420, May 3, 1990, abandoned, which is a continuation of Ser. No. 86,622, Aug. 18, 1987, abandoned.

[30] Foreign Application Priority Data

Aug. 20, 1986 [JP] Japan ............... 61-192964
Aug. 20, 1986 [JP] Japan ............... 61-192965
Aug. 22, 1986 [JP] Japan ............... 61-195682
Aug. 22, 1986 [JP] Japan ............... 61-196894

[51] Int. Cl.$^5$ ............................................. G09G 1/00
[52] U.S. Cl. .......................... 340/728; 340/731; 382/47; 358/451
[58] Field of Search ............ 340/723, 722, 728, 731; 364/518, 519, 521, 523, 715.01, 715.07, 723; 358/280, 451, 448; 382/44, 47; 395/102, 139, 128

[56] References Cited

U.S. PATENT DOCUMENTS

| | | | |
|---|---|---|---|
| 4,090,188 | 5/1978 | Suga | 340/731 |
| 4,575,717 | 3/1986 | Fedele | 340/728 |
| 4,602,294 | 7/1986 | Yamada | 364/518 |
| 4,627,002 | 12/1986 | Blum et al. | 340/728 |
| 4,651,287 | 3/1987 | Tsao | 364/519 |
| 4,682,243 | 7/1987 | Hatayama | 382/47 |

FOREIGN PATENT DOCUMENTS 0085351 8/1983 European Pat. Off. ............ 340/731

OTHER PUBLICATIONS

"Comparison of Interpolating Methods for Image Resampling", IEEE Transactions of Medical Imaging, vol. MI-2, No. 1 1983.

"Cubic Convolution Interpolation for Digital Image Processing", IEEE Transactions on Acoustics, Speech, and Signal Processing, vol. ASSP-29, No. 6, 1981.

*Primary Examiner*—Jeffery A. Brier
*Attorney, Agent, or Firm*—Fitzpatrick, Cella, Harper & Scinto

[57] ABSTRACT

An image processing apparatus for interpolating an input image and outputting an interpolated input image, includes a pipeline operation unit for selectively performing interpolation operations at a plurality of magnifications, a CPU for causing address counters to select one of the plurality of interpolation magnifications for the pipeline operation unit on the basis of an input image pixel count, an output medium pixel count, a designated output image count, and a designated output image layout, a display or printer for outputting an image interpolated by the pipeline operation unit in accordance with the designated output image layout. The input image is interpolated at a magnification determined such that a size of an output image falls within an area an output medium.

45 Claims, 31 Drawing Sheets

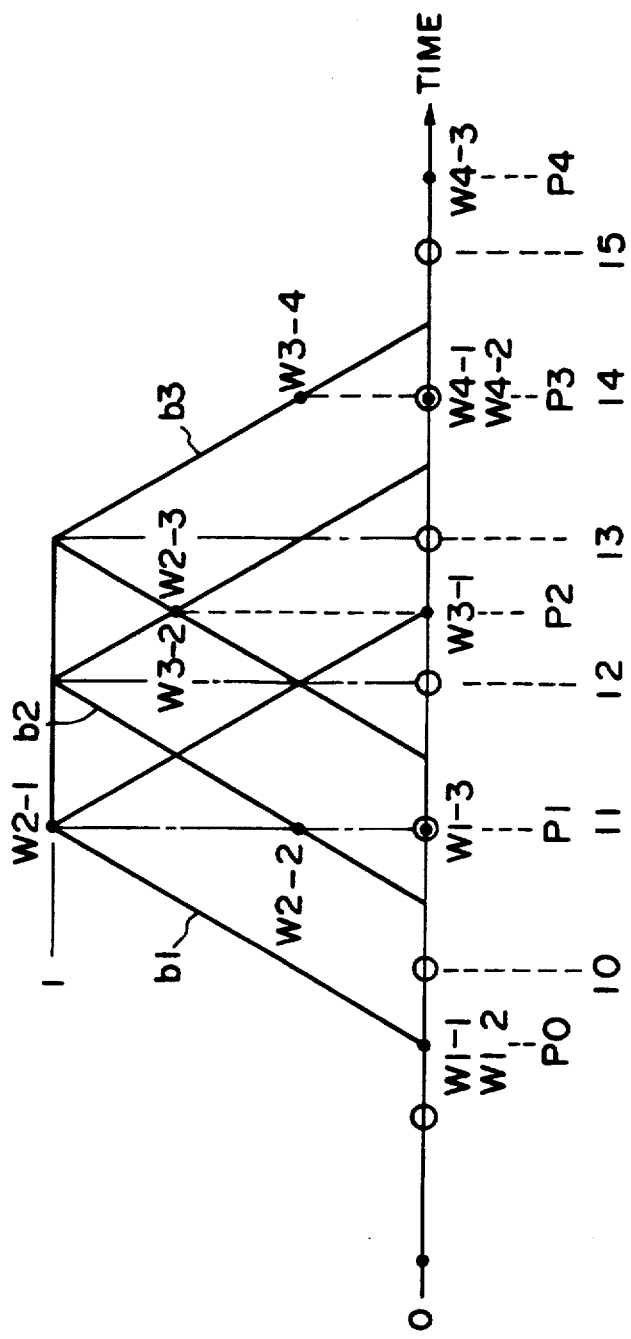

$I_1 = W1 \times P1 + W2 \times P2$

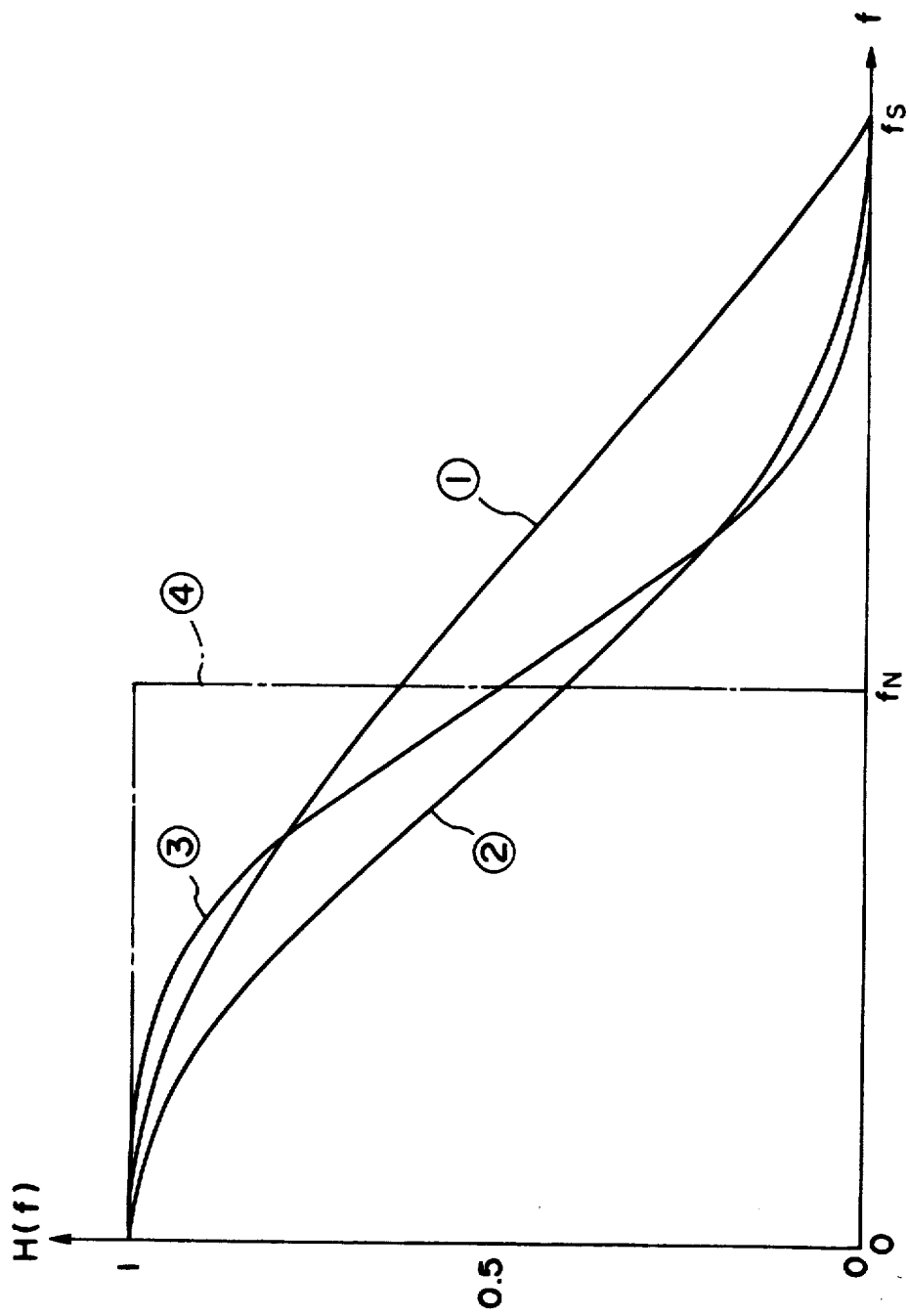

FIG.26(A)

| $S_{MAX}$ | L | L (INTEGER) |
|---|---|---|
| $\leq 1.05$ | $\geq 40.5$ | $= 41$ |
| $\leq 1.1$ | $\geq 20.5$ | $= 21$ |
| $\leq 1.15$ | $\geq 13.8$ | $= 14$ |
| $\leq 1.2$ | $\geq 10.5$ | $= 11$ |
| $\leq 1.25$ | $\geq 8.5$ | $= 9$ |
| $\leq 1.3$ | $\geq 7.1$ | $= 8$ |
| $\leq 1.4$ | $\geq 5.5$ | $= 6$ |
| $\leq 1.5$ | $\geq 4.4$ | $= 5$ |
| $\leq 1.6$ | $\geq 3.8$ | $= 4$ |

FIG.26(B)

| L | $S_{MAX}$ | $S_{MAX}$ Deviation |
|---|---|---|
| 32 | $= 1.06$ | $> 0.07$ |
| 16 | $= 1.13$ | $> 0.14$ |
| 8 | $= 1.27$ | $> 0.29$ |
| 4 | $= 1.56$ | |

FIG.26(C)

| K | K/8 | n / $2^n$ | 0 / 1 | 1 / 2 | 2 / 4 | 3 / 8 |
|---|---|---|---|---|---|---|
| 8 | 8/8 | | 1 | 2 | 4 | 8 |
| 9 | 9/8 | | 1.125 | 2.25 | 4.5 | 9 |
| 10 | 10/8 | | 1.25 | 2.5 | 5 | 10 |
| 11 | 11/8 | | 1.375 | 2.75 | 5.5 | 11 |
| 12 | 12/8 | | 1.5 | 3 | 6 | 12 |
| 13 | 13/8 | | 1.625 | 3.25 | 6.5 | 13 |
| 14 | 14/8 | | 1.75 | 3.5 | 7 | 14 |
| 15 | 15/8 | | 1.875 | 3.75 | 7.5 | 15 |

IMAGE PROCESSING APPARATUS

This application is a continuation of application Ser. No. 07/517,420 filed May 3, 1990, now abandoned, which was a continuation of application Ser. No. 07/086,622, filed Aug. 18, 1987, now abandoned.

BACKGROUND OF THE INVENTION

1. Field of the Invention

The present invention relates to image data interpolation processing and, more particularly, to an apparatus for performing high-speed or real-time processing of predetermined operation results by using an n-dimensional data string and for interpolating an input image at a magnification corresponding to the number of pixels of an output image.

2. Related Background Art

A conventional CRT multiformat camera is available as an image processing apparatus for outputting a plurality of images. In the multiformat camera, an image is displayed on a CRT and is picked up from different viewpoints. The images having different viewpoints are respectively projected on silver chloride films. In this case, when the optical path of light representing each image is not perpendicular to the silver chloride film and the CRT, image distortion is increased. In order to output a plurality of images, the silver chloride film or the CRT and the lens system must be moved relative to each other when each image is projected, thereby aligning the optical path in a direction perpendicular to the CRT screen or film surface. As a result, it takes a long period of time to output a large number of images.

Along with the recent development of the semiconductor industry, the packing density of IC memories can be increased and IC memories can be manufactured at low cost. Inexpensive, large-capacity memories are available, and it is thus possible to convert a plurality of images into digital image signals, combine these digital image signals, display a composite image on a CRT, and photograph such a composite image. However, since the resolution of the general-purpose CRT is still low, photographing of the image of the lens system at a large view angle undesirably causes a nonuniform illuminance distribution. Another problem is S/N ratio degradation associated with a CRT phosphor screen.

In order to compensate for these disadvantages of the conventional CRT multiformat camera, use of a laser beam printer has been proposed in recent years. A film surface is raster-scanned with a small laser spot, and thus a plurality of images formed in the memory can be simultaneously output. Therefore, a large number of images can be output within a short period of time. Each laser beam spot corresponds to one pixel, and a high resolution can be assured. In addition, since no phosphors are used, a higher S/N ratio can be obtained.

The size of an output image cannot be changed by an optical system in the laser beam printer, although the size of the output image can be changed by the lens system in the conventional CRT multiformat camera. In the conventional laser beam printer, pixels of the input image must be interpolated to change the size of the output image without changing the output pixels.

In the conventional laser beam printer, when the pixels are to be interpolated, the interpolated pixel data must be stored in a memory. As a result, real-time processing cannot be performed. In addition, since a value obtained by subtracting the number of pixels of a space between output images from the number of all possible output pixels is divided by the number of pixels of an input image to determine an interpolation magnification the image area on the output medium is predetermined.

Data interpolation will be described below.

In a conventional apparatus having a memory and operated to calculate data read out from the memory and to output operation results on a display or a printer, these calculations are mainly performed by computer software.

The conventional apparatus of this type requires a long operation time. If original data is to be preserved or retained, another memory different from the memory for storing original data is required to store data of operation results. In particular, in interpolation processing, the number of operated upon data is larger than that of original data, and a large-capacity memory is required. In order to shorten the operation time, another conventional apparatus comprises special-purposed hardware for performing pipeline processing. However, this apparatus still requires a large-capacity memory.

In any conventional apparatus, the bus line is occupied during data processing, and the computer cannot perform other tasks.

If substantially real-time output processing for an output device is performed during an operation of data output to a display or a printer, the operated results need not be retained. A display device such as a CRT and a printer (e.g., a laser beam printer) includes a blanking period. In particular, the blanking period in the laser beam printer often reaches 50% the total operation time. If the data is processed purely on the real-time basis, a period corresponding to 50% of the total operation time cannot be effectively utilized.

A new concept is proposed for data processing wherein an input data flow is different from an output data flow. A conventional data processing apparatus used for such data processing can be realized by software or a pipeline scheme.

Software has flexibility for allowing execution of any operation. However, processing itself is complicated, and the number of required data is increased, reducing the processing speed. Therefore, the solution utilizing software poses another problem on high-speed or real-time processing.

The solution utilizing the pipeline scheme allows high-speed or real-time processing. However, for example, if input or output data flows are not repeated at predetermined intervals or cycles, no practical simple apparatus is proposed due to use of a large-capacity memory.

In interpolation according to the above-mentioned pipeline scheme, any interpolation magnification can be obtained from the theoretical point of view. However, the scale of hardware is inevitably increased depending on a large number of required interpolation magnifications. In practice, the number of interpolation magnifications is preferably limited.

When the number of interpolation magnifications is excessively small, e.g., when the magnification is limited to an integer multiple in order to enlarge an image, the area is the square of the interpolation magnification, and the area magnifications are 1, 4, 9, 16, . . . . The enlargement ratios of adjacent steps are 4/1, 2.25/1, 1.78/1, . . . . When the enlargement ratio of the original image is low, the enlargement ratio in units of steps is increased, thus posing practical problems.

SUMMARY OF THE INVENTION

It is an object of the present invention to eliminate the conventional drawbacks described above.

It is another object of the present invention to provide an image processing apparatus for performing arbitrary real-time operations at high speed without a large-capacity memory by controlling an input or output data flow.

According to another aspect of the present invention is provided an apparatus comprising input means for inputting data at a first time-serial timing, operating means for performing predetermined operations on the basis of a plurality of data input from the input means, output means for outputting results obtained by the operating means at a second time-serial timing different from the first time-serial timing, and control means for matching the first and second time-serial timings, wherein the input and output data flowing at the first and second time-serial timings are matched and the predetermined operations are performed.

According to another aspect of the present invention is provided an apparatus comprising input means for inputting data at a first time-serial timing, operating means for performing predetermined operations on the basis of a plurality of data input from the input means, output means for outputting results obtained by the operating means at a second time-serial timing different from the first time-serial timing, control means for matching the first and second time-serial timings, and designating means for programmably designating operations of the input means, the operating means, the output means, and the control means wherein the input and output data flowing at the first and second time-serial timings are matched, the predetermined operations are performed, and the time-serial timings and the operations can be arbitrarily changed.

It is still another object of the invention to provide an image processing apparatus for performing data processing wherein a large-capacity memory for storing operation results is not required, a bus line can be effectively utilized during data processing, and a blanking period can be effectively utilized for data processing to provide a sufficient operation time margin.

According to another aspect of the present invention to provide an image processing apparatus comprising a direct memory access controller for controlling DMA of data at independent timings, a pipeline operation unit for accessing data at independent timings according to a pipeline scheme, an data output section for outputting the accessed data at independent timings, and at least a pair of line buffers for connecting the direct memory access controller, the pipeline operation unit, and the data output section, wherein the direct memory access controller, the pipeline operation unit, and the data output section access the data at the optimal independent timings of their own, and the line buffer matches data flows between the direct memory access controller, the pipeline operation unit, and the data output section.

It is still another object of the present invention to provide an image processing apparatus wherein a large-capacity memory is not required, highspeed or real-time interpolation processing of an image can be performed, the area occupied by the image on the output medium can be maximized, the image can be readily visually recognized, and cost performance can be improved.

According to another aspect of the present invention is provided an image processing apparatus comprising interpolating means for selectively performing interpolation at a plurality of magnifications, selecting means for selecting a proper one of the interpolation magnifications for the interpolating means on the basis of the number of pixels of the input image, the number of pixels of the output medium, the number of designated output images, and the layout of the output images, and output means for outputting the images interpolated by the interpolating means according to the designated layout, wherein interpolation processing of the input image is performed at a magnification which allows the output image to fall within the area of the output medium.

It is still another object of the present invention to provide a pipeline data processing apparatus wherein a large-capacity memory is not required, highspeed or real-time interpolation processing can be performed, and an interpolation magnification can be selected at a one-to-one magnification ratio without providing large modifications.

According to another aspect of the present invention is provided an apparatus comprising designating means for designating an interpolation magnification represented by:

$$B^n \times k/L$$

where B and L are constants, in which B is a positive integer and L is an integer equal to or greater than 2; and n and k are variables, in which n is a positive integer including zero, and k is an integer equal to or greater than L and less than $B \times L$, input means for inputting data at a timing corresponding to the interpolation magnification designated by the designating means, operating means for performing interpolation operations corresponding to the interpolation magnification on the basis of a plurality of data input by the input means, output means for outputting results of operations performed by the operating means at a predetermined timing, and control means for matching a data flow of the input means with a data flow with the output means, wherein the data input by the input means is interpolated by the operating means at the interpolation magnification at a timing corresponding to the interpolation magnification represented by the above expression designated by the designating means.

BRIEF DESCRIPTION OF THE DRAWINGS

FIGS. 4(A) and 4(B) are charts showing the relationship between the data positions and the weighting coefficients when linear (bilinear) interpolation is performed;

FIG. 15 is a graph showing spectra of the interpolation functions shown in FIG. 14;

FIGS. 26(A) to 26(C) are tables showing data flows in the interpolation operation.

DETAILED DESCRIPTION OF THE PREFERRED EMBODIMENTS

A preferred embodiment of the present invention will be described with reference to the accompanying drawings.

Block Diagram

Figure 21:
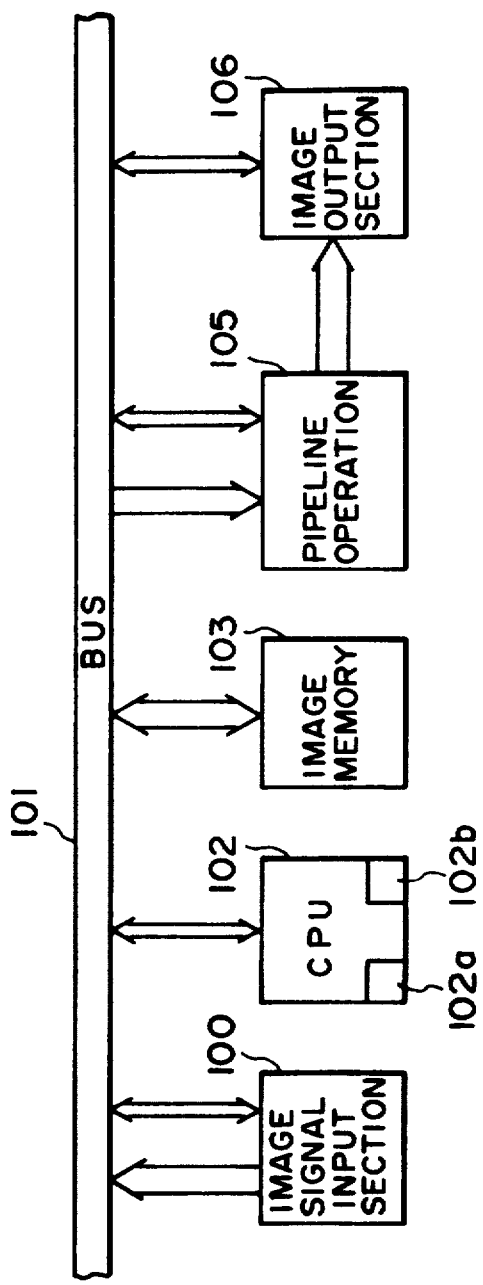
FIG. 21 is a block diagram of an image processing apparatus according to an embodiment of the present invention.

FIG. 21 is a block diagram of an image processing apparatus according to an embodiment of the present invention. In the image processing apparatus, an image signal input section 100, a CPU 102, an image memory 103, a pipeline operation unit 105, an image output section 106 are connected to a bus line 101. The CPU 102 includes a ROM 102a for storing permanent programs and a RAM 102b as an auxiliary memory. The image signal input section 100 is connected to an image forming means (not shown) or an image input means (not shown). When an image signal input to the image signal input section 100 is a digital signal, the input section 100 is an digital interface. However, if the input image signal is an analog signal, the input section 100 A/D-converts the analog signal and the output digital signal is sent onto the bus line 101. More specifically, the image processing apparatus can be a copying machine, a still video camera, or the like which processes analog or digital data.

In order to readily understand image signal flows, they are represented by thick lines in FIG. 21. Although the CPU 102 can process the image signal, such processing is not directly associated with the scope of the present invention. The image signal is not input to the CPU 102. The image signal is DMA-transferred from the image signal input section 100 to the image memory 103. The image memory 103 has a capacity for storing a plurality of images. At the same time, information representing the image format and output is supplied from the image signal input section 100 to the CPU 102, so that such information is stored in the RAM 102b in the CPU 102. The information includes information representing the number of pixels of one input image and a layout of output images, interpolation mode information concerning an interpolation technique for the image, and gray scale processing information. These pieces of information can be input at an input means (not shown) such as a keyboard.

The image output section 106 supplies output medium size information to the CPU 102, and this information is stored in the RAM 102b in the CPU 102. The CPU 102 calculates a total number of possible pixels output to the output medium according to the number of possible output pixels in the image output section 106. Alternatively, the total number of possible pixels of the output image may be selected from the lists stored in the RAM 102b. The pipeline operation unit 105 performs interpolation processing whose possible interpolation magnifications are limited, as shown in FIG. 26(C). This interpolation magnification menu is prestored in the RAM 102b in the CPU 102. Of all pieces of information, the input pixel count information, the output image layout information, and total output image pixel count information are used to select an optimal one of the interpolation magnifications from the interpolation magnification menu according to a calculation method (to be described later). The selected optimal interpolation magnification is set in the pipeline operation unit 105 through the bus line 101. The spaces excluding the image portions on the output medium are calculated as a space pixel count prior to interpolation. The image output section 106 may be any output device if it can perform raster scanning.

Flow Chart

Figure 24:
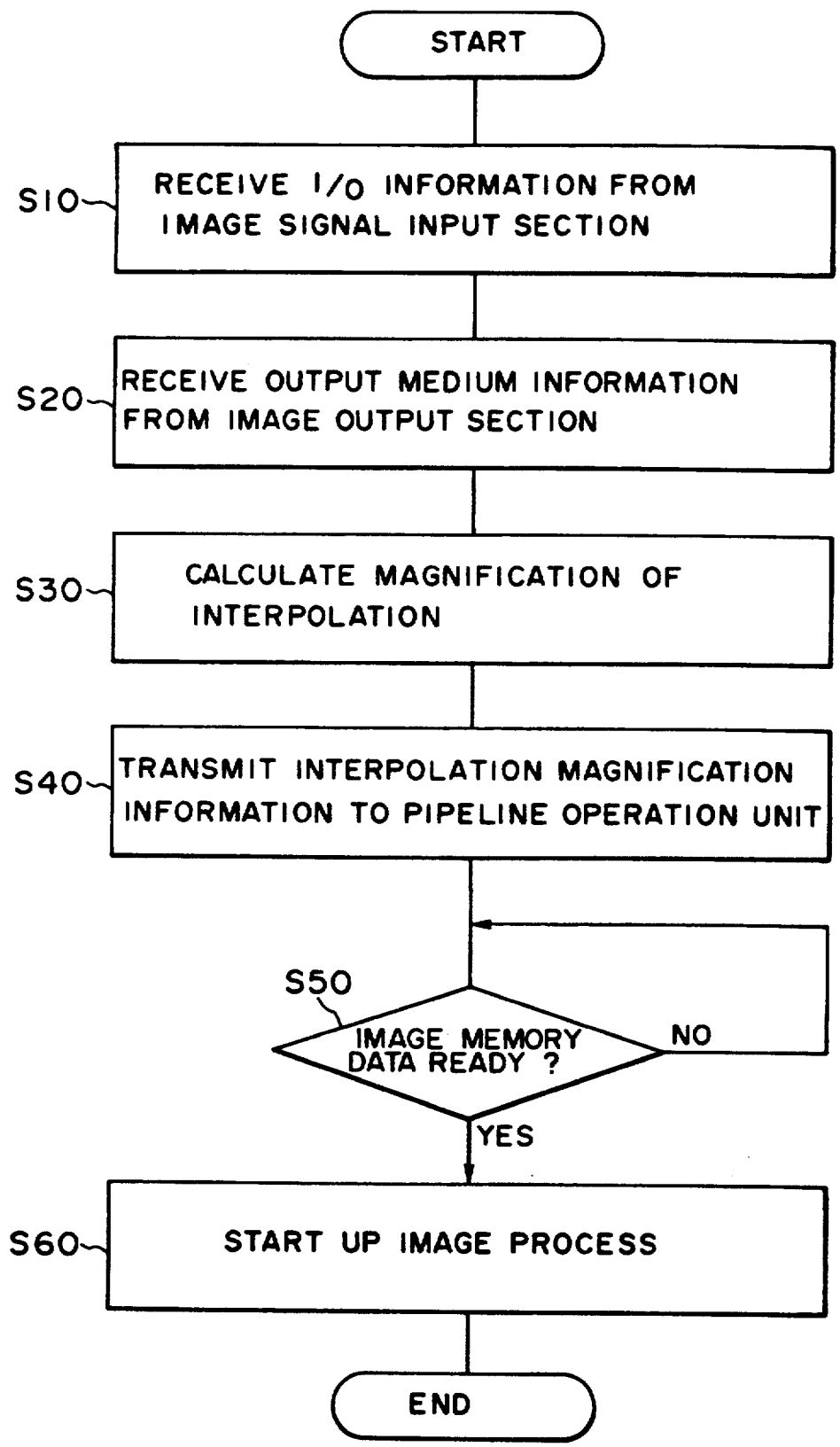
FIG. 24 is a flow chart for explaining the operation of the image processing apparatus shown in FIG. 21.

FIG. 24 is a flow chart for explaining the operation of the image processing apparatus according to permanent programs stored in the ROM 102a. In step S10, input/output information representing the image format and the like is received from the image signal input section 100. In step S20, information representing an output medium size and the like is received from the image output section 106. In step S30, the CPU 102 calculates an interpolation magnification on the basis of the pieces of information received in steps S10 and S20. At the same time, the CPU 102 calculates a space pixel count. In step S40, interpolation magnification execution information calculated in step S30 is sent to the pipeline operation unit 105. The pipeline operation unit 105 selects an input data flow and weighting coefficients during operations on the basis of the input information. The CPU 102 determines in step S50 whether image data is written in the image memory 103 through the image signal input section 100. The CPU 102 waits for the end of data write operation. When the image data is ready, the CPU 102 sets up image processing. After this, the following operations will be performed.

The pipeline operation unit 105 includes an input line buffer memory corresponding to one main-scan line of the image output section 106 (to be described later). When an output operation is started, the input line buffer memory receives a default value of space pixel count at the start area of the memory. Subsequently, an image having pixels of one line is DMA-transferred from the image memory 103 to the buffer memory, and then the space between the images is written next to the one-line image. The second image having pixels of one line is written next to the space data. The above operation is repeated, and a space is written in the end area of the buffer memory. Therefore, the input line buffer memory successively stores the space and image pixel data which are obtained by dividing the main-scan output image pixel count by the interpolation magnification. The data written in the input line buffer memory is interpolated and expanded by the pipe line operation unit 105 (to be described in detail later) and is written in the output line buffer memory according to the pipeline scheme. Therefore, the output line buffer memory stores the main-scan output image pixel count data. Gray scale processing and the like of the data written in the output line buffer are performed by the image output section 106, and then an output, e.g., display or recording is performed.

Contents of Buffer Memory

Figure 22:
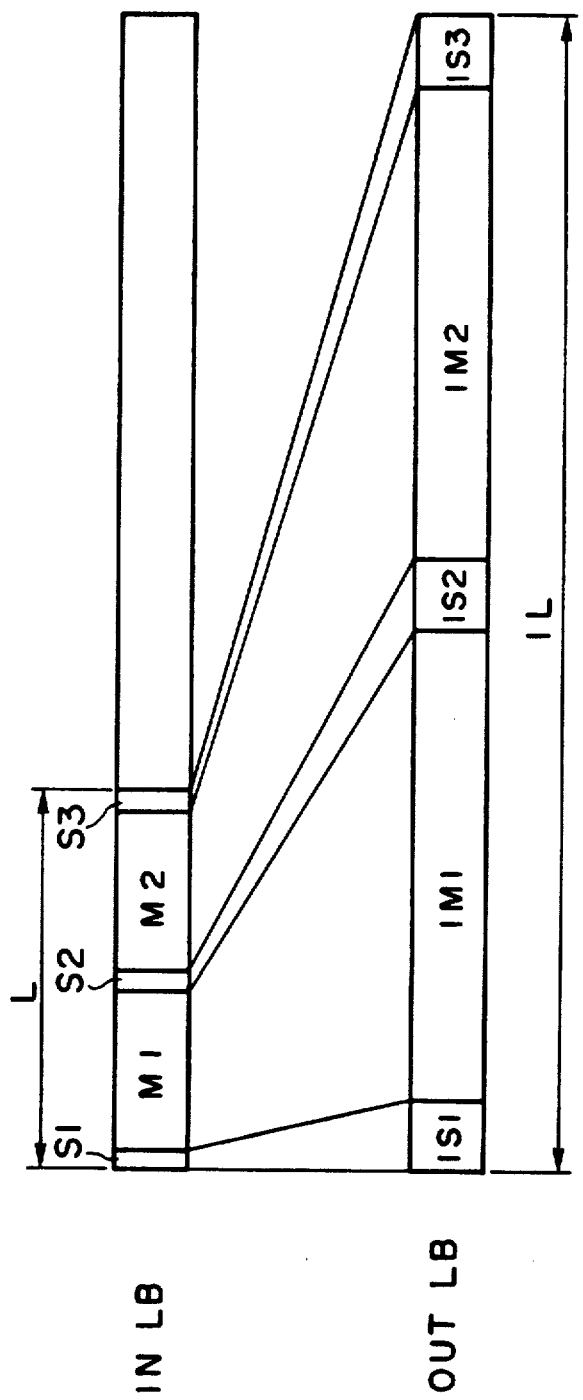
FIG. 22 shows data formats showing the relationship between the input and output line buffers in the image processing apparatus in FIG. 21.

The contents of the input and output line buffer memories are shown in FIG. 22. It should be noted that two images are aligned in the main-scan direction.

An input line buffer memory INLB and an output line buffer memory OUTLB have the formats shown in FIG. 22. The format of the buffer memory INLB includes input space data S1, S2, and S3 and different one-line image data M1 and M2. The data S1, S2, and S3, M1, and M2 are interpolated as data IS1, IS2, IS3, IM1, and IM2. The buffer memory INLB has a total pixel count L, and the buffer memory OUTLB has a total pixel count IL. The count IL is a total output pixel count along the main-scan direction. Ratios of M1 to IM1 and M2 to IM2 are independently determined according to different interpolation magnifications. However, since counts L and IL are always integers, the ratio of L to IL does not necessarily coincide with the interpolation magnification accurately. This processing will be described later.

Before the input image is transferred to the buffer memory INLB, a default value of a space having lines corresponding to L is written in the buffer memory INLB. The sub-scan spaces between the images and the space at the end area of the memory are calculated. Line control for writing the sub-scan space and line control for writing the input image in the buffer memory INLB are performed according to a sequence to be described later.

Method of Determining Interpolation Magnification and Space Outside Image

A method of determining the interpolation magnification and the space outside the image will be described below. The main-scan direction is defined as H and the sub-scan direction is defined as V. The direction of the input image is given as H or V in the direction corresponding to the direction of the output image.

Main- and sub-scan input image pixel counts are given as PH and PV, total main- and sub-scan output pixel counts are given as TH and TV, main- and sub-scan virtual interpolation magnifications are given as MH and MV, and total main- and sub-scan space pixel counts figured out as the pixel counts prior to interpolation are given as BH and BV, respectively. In the following description, an aspect ratio of the pixels of the input image is given as 1, and an aspect ratio of pixels of the output image is given as 1, so that the interpolation ratios in the main- and sub-scan directions are identical. Images will be arranged on the output medium in a matrix form, and the numbers of images along the main- and sub-scan directions are given as FH and FV, respectively. Images are maximized on the output medium without omissions of the corresponding input images. In order to satisfy this, the following inequalities must be established:

$$(PH \times FH) \times MH \leq TH \quad (33)$$

$$(PV \times FV) \times MV \leq TV \quad (34)$$

Inequalities (33) and (34) are rewritten as follows:

$$MH \leq TH/(PH \times FH) \quad (35)$$

$$MV \leq TV/(PV \times FV) \quad (36)$$

Data PH, PV, FH, and FV are input from the image signal input section 100, as described above, and data TH and TV are determined in accordance with the type of output device and the size of the output medium. Therefore, inequalities (33) and (34) can be calculated and must be simultaneously satisfied. Since the main- and sub-scan interpolation magnifications are equal to each other, a smaller one of the maximum values of MH and MV must be selected as a maximum value of the interpolation magnification. The selected maximum value is given as ML. The number of interpolation magnifications used in the pipeline operation unit 105 is limited, and the corresponding interpolation magnification menu is given as Mi (i=1, 2, 3).

In the case of FIG. 26(c), 32 interpolation magnifications are available.

If the maximum value of Mi which satisfies the following inequality $$Mi \leq ML \quad (37)$$

is selected from the interpolation magnification menu, the following condition is evidently given:

$$Mi \leq ML \leq MH, MV \quad (38)$$

there is a possibility to satisfy Mi<MH, MV. If the blank portion on the output medium is given as the space, BH and BV are determined to establish $$\{(PH \times FH) + BH\} \times Mi = TH \quad (39)$$

$$\{(PV \times FV) + BV\} \times Mi = TV \quad (40)$$

Since Mi is determined, $$BH = TH/Mi - (PH \times FH) \quad (41)$$

$$BV = TV/Mi - (PV \times FV) \quad (42)$$

can be calculated. If the spaces between the images are uniformly distributed, the main- and sub-scan spaces SH and SV including the end spaces are given as follows:

$$SH = BH/(FH + 1) \quad (43)$$
$$= \{TH/Mi - (PH \times FH)\}/(FH + 1)$$

$$SV = BV/(FV + 1) \quad (44)$$
$$= \{TV/Mi - (PV \times FV)\}/(FV + 1)$$

Data SH and SV are not necessarily integers but often nonintegers. In this case, fractions are rounded down and the resultant integers of SH and SV are given as SHT and SVT. Similarly, the data BH and BV are not necessarily integers, and values obtained by rounding up the values BH and BV are given as BHT and BVT. Differences between BTH and the sum of values SHT and between BVT and the sum of values SVT are given as ΔH and ΔV as follows:

$$\Delta H = BHT - SHT \times (FH+1) \quad (45)$$

$$\Delta V = BVT - SVT \times (FV+1) \quad (46)$$

The differences ΔH and ΔV are integers and are properly distributed in the (FH+1) and (FV+1). The intervals are not often uniform, which has been does not pose any practical problem.

Figure 23:
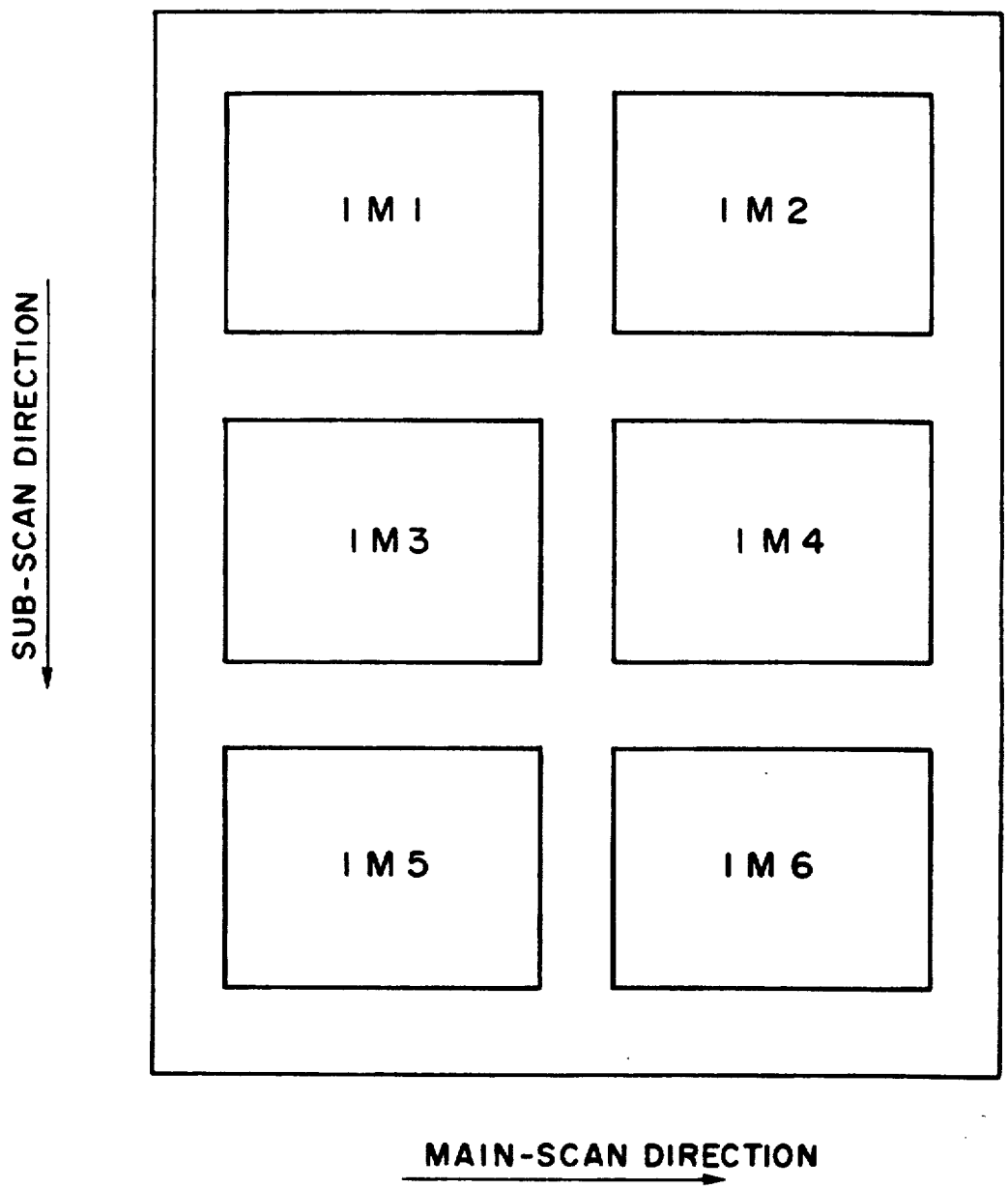
FIG. 23 is a schematic view showing an output from the image processing apparatus shown in FIG. 21.

Assume that PH=600, PV=450, TH=4,000, TV=5,000, FH=2, and FV=3. In other words, six IM1 to IM6 are output in a 2×3 matrix form, as shown in FIG. 23.

Interpolation Magnification Menu

The interpolation magnification menu is given, as shown in FIG. 26(c).

Substitutions of the above values into inequalities (35) and (36) yield the following inequalities:

$$MH \leq 4000/(600 \times 2) = 3.33 \quad (47)$$

$$MV \leq 5000/(450 \times 3) = 3.70 \quad (48)$$

Since MH<MV is established, ML=MH is given, so that the following relation is derived from FIG. 26(c):

$$Mi = 3.25 < ML \quad (49)$$

Substitutions of the assumed values into equations (41), (42), (43), and (44) yield the following relations:

$$BH = 4000/3.25 - (600 \times 2) = 30.8 \quad (50)$$

$$BV = 5000/3.25 - (450 \times 3) = 188.5 \quad (51)$$

$$SH = 10.3 \quad (52)$$

$$SV = 47.1 \quad (53)$$

therefore, BHT=31, BVT=189, and SHT=47, so that $$\Delta H = 31 - (10 \times 3) = 1 \quad (54)$$

$$\Delta V = 189 - (47 \times 4) = 1 \quad (55)$$

Since BH and BV are rounded up, total output image pixel counts are subjected to overflows. The total output image pixel counts are given by the lefthand sides of equations (39) and (40) as follows:

$$\{(600 \times 2) + 31\} \times 3.25 = 4000.75 > 4000 \quad (56)$$

$$\{(450 \times 3) + 189\} \times 3.25 = 5001.75 > 5000 \quad (57)$$

The differences ΔH and ΔV are corrected at the rear ends. More specifically, the differences are corrected at S3 of FIG. 22 and the right end of FIG. 23 along the mainscan direction and at the lower end of FIG. 23 along the sub-scan direction. The overflow components appear in the space, and the image areas are not adversely affected.

An area ratio of the image to the output medium is given as follows:

$$(600 \times 450) \times (2 \times 3) \times 3.25^2/4000 \times 5000 = 85.6 \quad (58)$$

Therefore, 85.6% of the output medium can be effectively used.

In the above description, the aspect ratios of the pixels of the input and output images are given as 1. However, the aspect ratios are not limited to this.

For example, if an aspect ratio of pixels of the input image is given as a : b where a is the number of pixels along the H direction and b is the number of pixels along the V direction, and if the aspect ratio of the pixels of the output image is given as 1 : 1, an Mi combination which satisfies both inequalities (35) and (36) is selected, and the values a and b are independently calculated to obtain the desired aspect ratio.

Similarly, if the aspect ratio of pixels of the input image is given as 1 : 1 and the aspect ratio of pixels of the output image is given as a : b, an Mi combination which satisfies both inequalities (35) is selected and (36), and a and b are independently calculated.

Even if the aspect ratios of pixels of the input and output images are given as 1 : 1 but if the interpolation magnification of the output image is intentionally changed to a : b, among Mi combinations satisfying both inequalities (35) and (36), the Mi combination substantially satisfying relation MiH : MiV = a : b is selected, and a and b are independently calculated.

Figure 17:
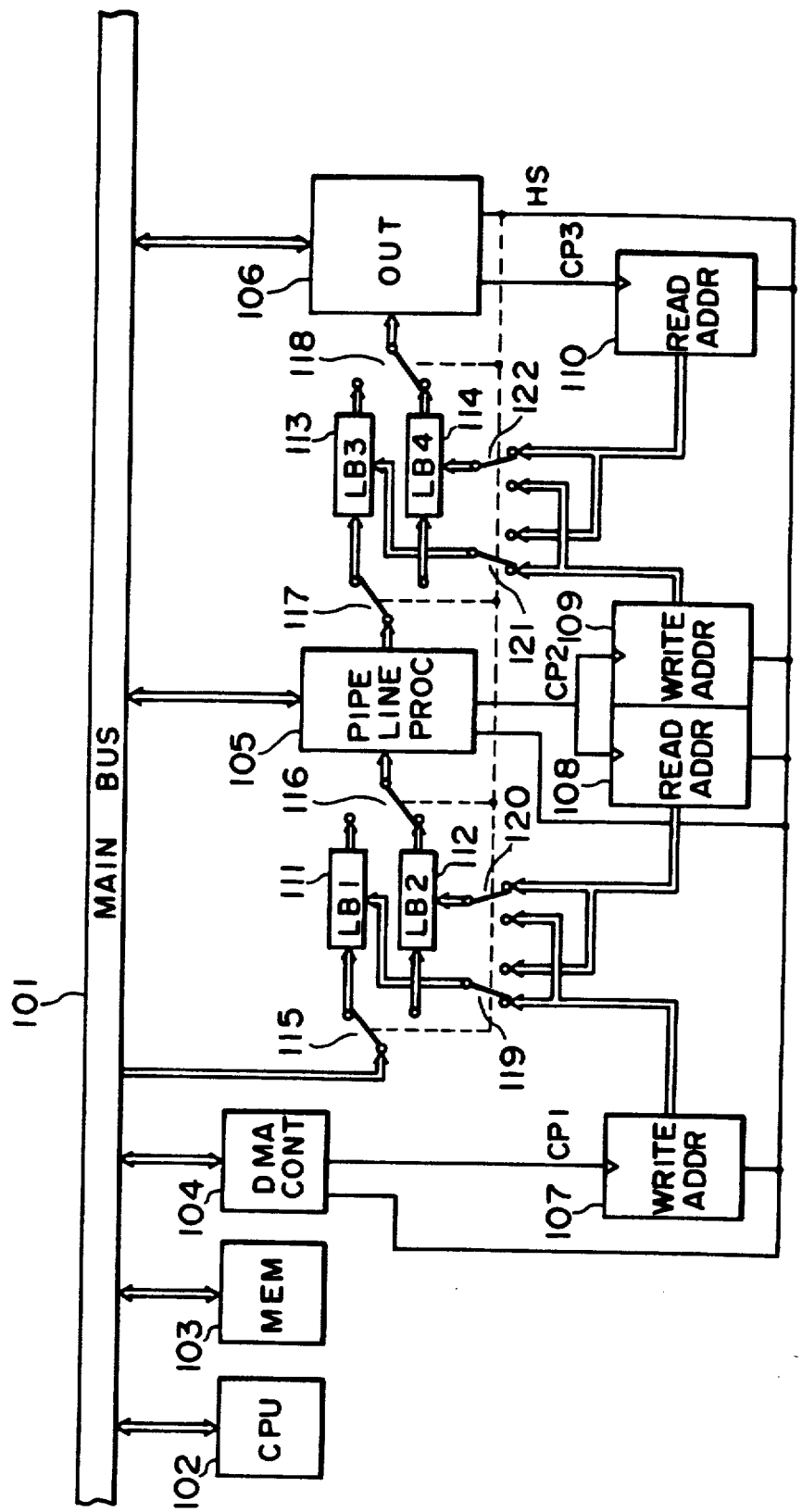
FIG. 17 is a block diagram of a data processing apparatus in which a pipeline operation unit is illustrated in detail.
Figure 18:
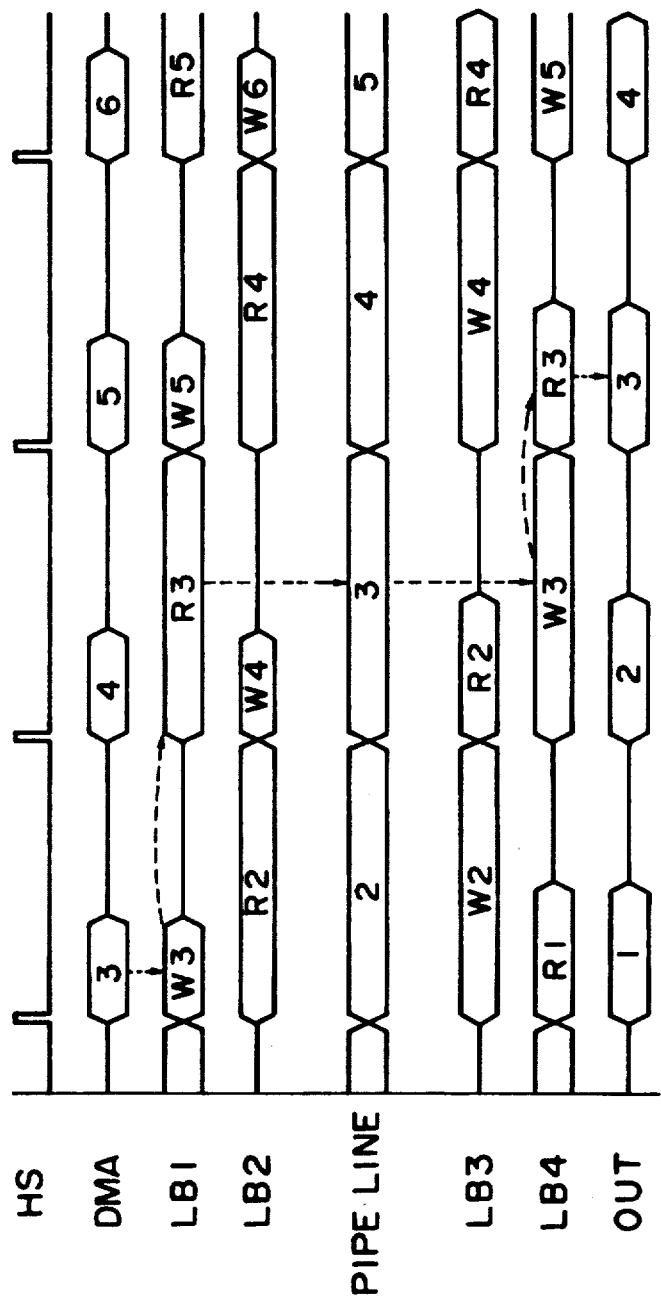
FIG. 18 is a timing chart showing a data flow in units of lines in the circuit components of the apparatus in FIG. 17.

Block Diagram of Circuit Components Having Pipeline Operation Unit as Central Component FIG. 17 is a detailed block diagram of the image processing apparatus having the pipeline operation unit 105 (FIG. 21) as the central circuit component, and FIG. 18 is a timing chart showing the data flow in units of lines in each circuit component of FIG. 17.

The CPU 102, the image memory (MEM) 103, a DMA (Direct Memory Access) controller (DMA CONT) 104, the pipeline operation unit (PIPELINE PROC) 105, and the image output section (OUT) 106 are connected to the bus line 101. It should be noted that the image signal input section 100 is omitted from the arrangement shown in FIG. 17.

The DMA controller 104, the pipeline operation unit 105, and the image output section 106 generate independent data transfer clocks CP1, CP2, and CP3 to drive address counter (WRITE ADDR) 107, address counters (READ ADDR and WRITE ADDR) 108 and 109, and an address counter (READ ADDR) 110 respectively. The address counter 107 is used for DMA and generates write address signals for line buffer memories (LB1 and LB2) 111 and 112. The address counters 108 and 109 are used for arithmetic operations and generate read address signals for the line buffer memories 111 and 112 and write address signals for line buffer memories (LB3 and LB4) 113 and 114. The address counter 110 generates read address signals for the line buffer memories 113 and 114.

The image output section 106 generates a sync signal HS in units of lines and resets the address counters 107 to 110. When the data output section 106 serves as a two-dimensional image output device, the sync signal HS is a main-scan or horizontal sync signal. The image output section 106 supplies the sync signal HS to the DMA controller 104, and the DMA controller 104 controls a write address of the image memory 103. When the pipeline operation unit 105 performs two-dimensional processing, the sync signal HS is used to transfer line data in the pipeline operation unit 105.

Data transfer switch circuits 115 and 117 are controlled in response to a write enable signal for the line buffer memories 111 to 114. Data transfer switch circuits 116 and 118 are constituted by a multiplexer. Switch circuits 119 to 122 are used to update address signals for the line buffer memories 111 to 114. The switches 119 to 122 can be constituted by a multiplexer in the same manner as the switch circuits 116 and 118.

The CPU 102 instructs a data output mode of the DMA controller 104 and sets start and end addresses of data read out from the image memory 103. The CPU 102 sets the pipeline operation unit 105 in the processing mode and sends various parameter setting signals and control signals thereto as needed. In this embodiment, the CPU 102 sends interpolation magnification setting information to the pipeline operation unit 105. The CPU 102 performing updating of a look-up table and mode setting such as data inversion for the image output section 106.

When the CPU 102 instructs a data output mode, the DMA controller 104 DMA-transfers data from the image memory 103 to the line buffer 111 or 112 in response to the sync signal HS. When the switch circuit 115 selects the line buffer 111, the switch circuit 116 selects the line buffer 112. The switch circuit 119 selects the address counter 107, and the switch circuit 120 selects the address counter 108. The data read out from the image memory 103 is stored in the line buffer 111 through the switch circuit 115 in accordance with an address signal output from the address counter 107. The data written in the line buffer 112 is read out in accordance with an address signal output from the address counter 108 and is interpolated by the pipeline operation unit 105 through the switch circuit 116.

The data interpolated by the pipeline operation unit 105 is written in the line buffer 113 or 114. If the switch circuit 117 selects the line buffer 113, the switch circuit 118 selects the line buffer 114. In this case, the switch circuit 121 selects the address counter 109, and the switch circuit 122 selects the address counter 110. Output data from the pipeline operation unit 105 is written in the line buffer 113 through the switch circuit 117 in accordance with the address signal from the address counter 109. The data written in the line buffer 114 is read out in accordance with the address signal output from the address counter 110 and is input to the image output section 106 through the switch circuit 118. The data is output from the image output section 106 in accordance with the output format set in the output section 106.

The signals CP1, CP2, and CP3 are clock signals having independent clock rates, as previously described. The rate of the clock signal CP2 is the highest to cause the pipeline operation unit 105 to effectively utilize the blanking period essentially given to the data output section 106. In the timing chart of FIG. 18, condition CP1 > CP3 > CP2 is established. A write period is represented by W, and a read period is represented by R. Line numbers are affixed to the write and read periods W and R in order to readily understand line transfer states. When one-line data transfer, its interpolation and its output are completed, the switches 115 to 122 are inverted in response to the next sync signal HS. In this case, the line buffers 112 and 114 are set in the write mode, and the line buffers 111 and 113 are set in the read mode. In this manner, data transfer, data interpolation, and data output can be continuously performed. In other words, real-time processing in units of lines can be performed in this embodiment.

As is apparent from the timing chart of FIG. 18, DMA transfer from the image memory 103 to the DMA controller 104 can be performed for a short period of time. The bus line 101 is occupied by DMA transfer for only a short period of time. The CPU 102 can use spare time to perform other tasks through the bus line 101. The blanking time is provided to the image output section 106, as shown in FIG. 18. However, interpolation in the pipeline operation unit 105 can be performed independently of the data output. In this manner, processing time per data is prolonged, and thus inexpensive low-speed ICs can be used to reduce cost. As is also apparent from FIG. 18, in this embodiment, two pairs of line buffer memories are used, two-line delay occurs during DMA transfer and the data output. In recent years, FIFO (First-In First-Out) controller ICs such as 80×6 from Signetics Corp. are commercially available. These FIFO controller ICs can be used as the above-mentioned circuit components 107 to 118 to simplify the circuit arrangement.

Image Output Section

Figure 19:
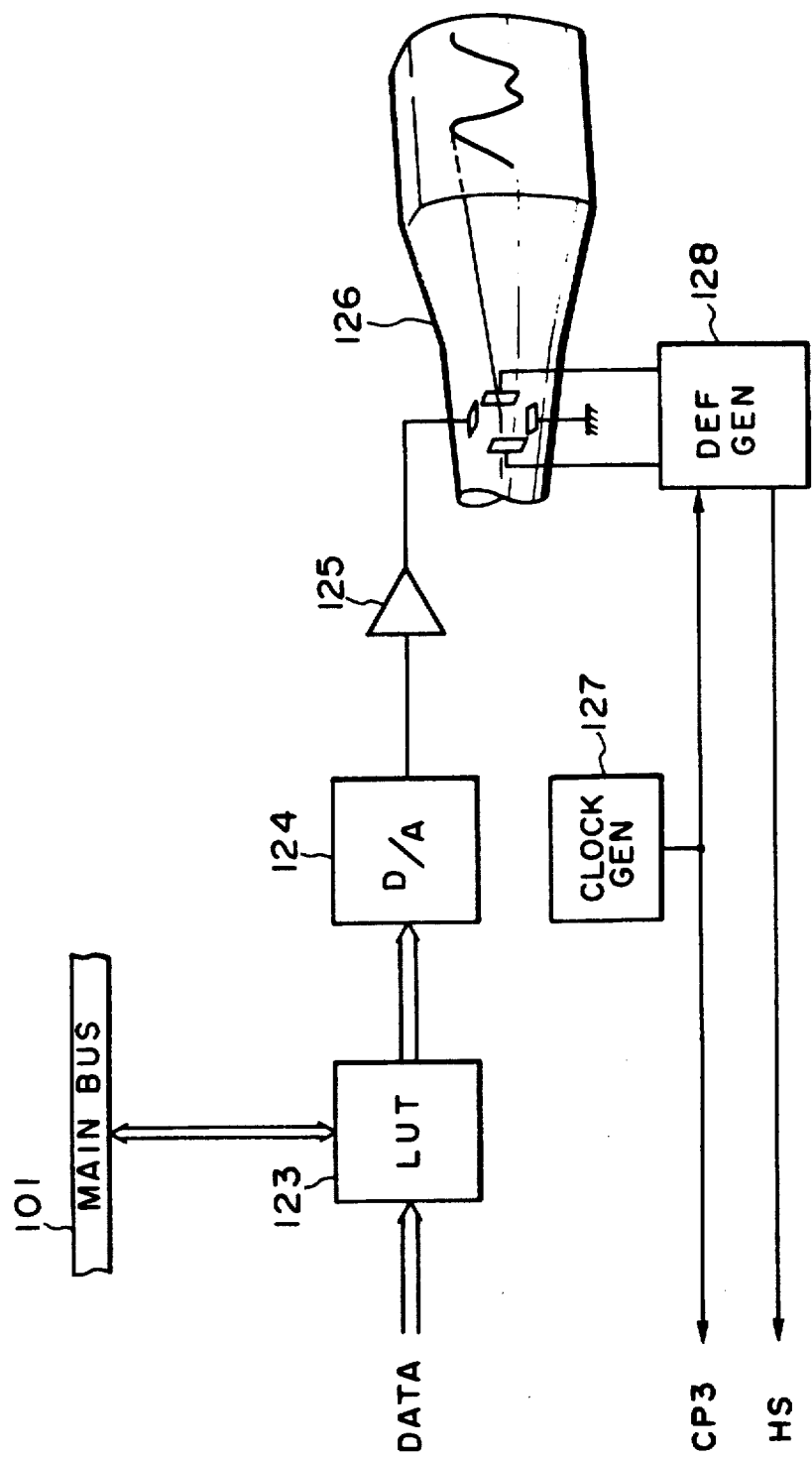
FIGS. 19 and 20 are respectively diagrams showing arrangements of the data output section (OUT) in FIG. 17.

FIG. 19 is an arrangement of an output portion of the image output section 106 shown in FIG. 17. A bus line 101 in FIG. 19 is the same as that in FIG. 17 and is connected to a look-up table (LUT) 123 and updates the contents of the look-up table 123. The look-up table 123 is used to window data and performs nonlinear conversion. The look-up table 123 receives the interpolated data from the switch circuit 118 in FIG. 17. The data output from the conversion table is converted into an analog signal by a D/A converter 124 and drives a vertical deflection electrode in a CRT 126 through an amplifier 125.

A horizontal deflection electrode in the CRT 126 scans electron beams in the horizontal direction at predetermined cycles in response to an output from a deflection signal generator (DEF GEN) 128. A waveform is thus displayed on the CRT 126. The output CP3 from a clock generator (CLOCK GEN) 127 is frequency-divided by the deflection signal generator 128 into the horizontal sync signal HS. The CRT 126 is raster-scanned by the deflection signal generator 128 in the horizontal and vertical directions. When an output signal from the amplifier 125 is luminance-modulated with electron beams in the CRT 126, a two-dimensional image is displayed on the CRT 126.

Laser Beam Printer

Figure 20:
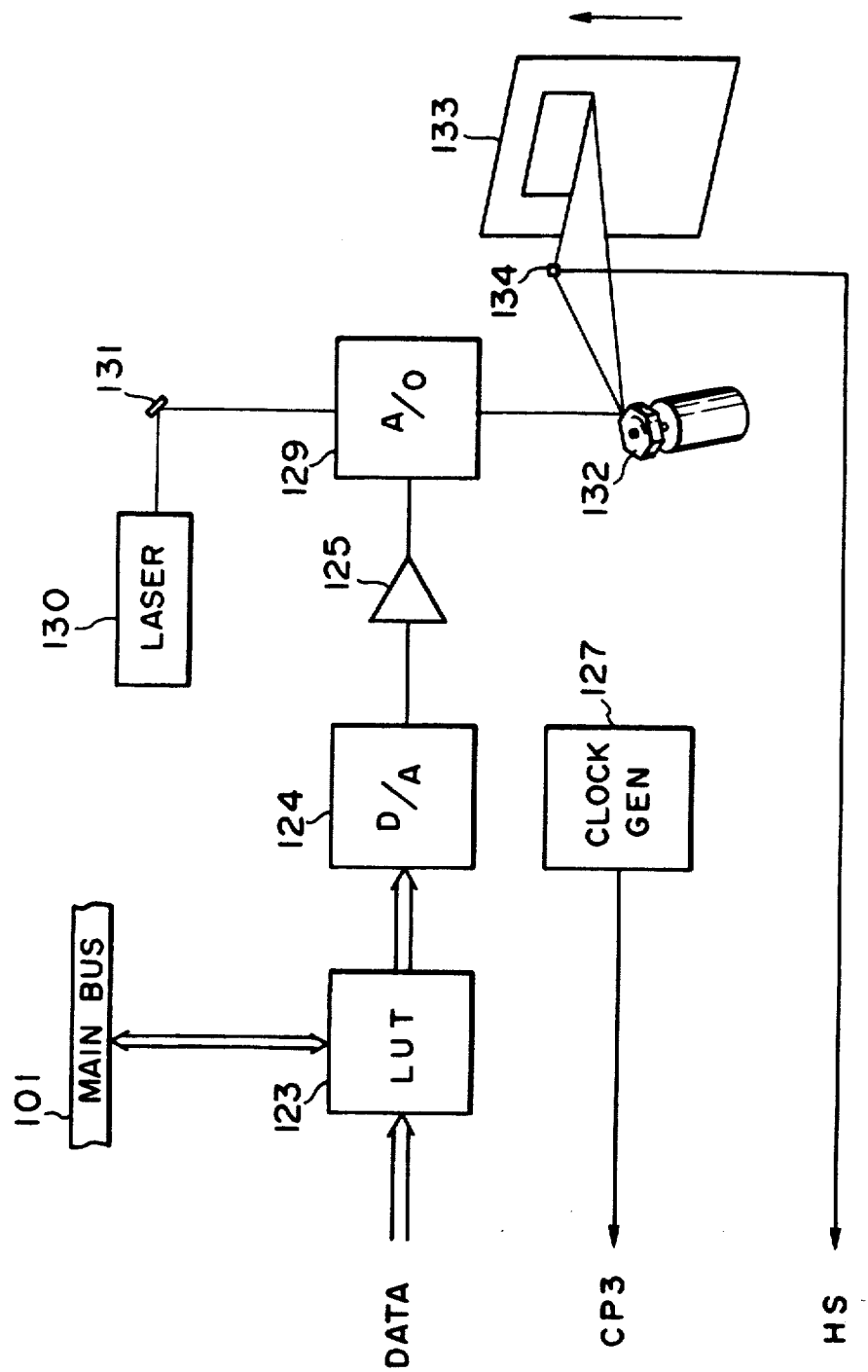

FIG. 20 shows a laser beam printer for performing two-dimensional raster scanning. Circuit components represented by reference numerals 101, 123, 124, 125, and 127 are the same as those in FIG. 19. An output from an amplifier 125 drives an AO modulator 129 (ultrasonic optimal modulation element). A laser beam from a laser 130 is intensity-modulated by the AO modulator 129 through a mirror 131 in accordance with an output signal from the amplifier 125. The laser beam scans a film 133 through a rotary polygonal mirror 132 in the main-scan direction. The film 133 is scanned by a film moving mechanism (not shown) in a direction of an arrow, i.e., in the sub-scan direction to form a latent image corresponding to the data on the film 133. Some laser beams from the polygonal mirror 132 are detected by a photosensor 134 and serve as the main-scan sync signal HS. The signal HS is used for reset the address counters 107 to 110, as previously described. The film 133 may be another medium such as an electrophotographic photosensitive body. If the medium is sensitive to a semiconductor laser, the AO modulator 129 can be omitted. In this case, the output from the amplifier 125 directly drives the laser. This embodiment is not limited to the laser printer, but the laser printer can be replaced with an ink-jet printer.

This embodiment is not limited to the contents of data processing. The pipeline operation unit 105 in FIG. 17 may perform filter operations. However, in particular, when interpolation is performed, the number of data as the operation results is larger than that of original data, thus reducing the size of the memory, which is one of the advantages of this embodiment.

In this embodiment as described above, each line buffer memory is connected to each of the input and output terminals of the pipeline operation unit. In addition, pipeline processing is performed by a bus different from the main bus connected to the CPU. Different access times are provided between the main memory and the line buffer memory, between the line buffer memory, pipeline operation unit, and the line buffer memory, and between the line buffer memory and the data output section. Use of a large-capacity memory as the disadvantage of the conventional apparatus can be prevented. The CPU can effectively use the bus line during data processing. The blanking period of the data output section can be effectively utilized, a sufficient processing time margin can be obtained, and an inexpensive apparatus can be obtained.

Pipeline Operation Unit

The pipeline operation unit 105 will be described in detail.

Description of Interpolation Methods (1) Interpolation of Nearest Elements (Nearest Neighbor)
(2) Linear Interpolation (Bilinear)
(3) Three-dimensional Interpolation (Cubic Spline)

Interpolation (1) is called a replication since the same data as the original data is interpolated. Interpolation (3) is called a cubic spline interpolation since it utilizes a three-dimensional spline function. The operation methods and their characteristics are described in detail in the following references:

R. G. Keys. "Cubic Convolution Interpolation for Digital Image Processing" IEEE Trans. Acoust., Speech, Signal Processing, vol. ASSP-29, No. 6, Dec. 1981; and J. A. Parker, R. V. Kenyon, and D. E. Trexel, "Comparison of Interpolating Methods for Image Resampling" IEEE Trans. on Medical Imaging, vol. MI-2, Mar 1983.

The nearest neighbor method of interpolation, especially simple from a computational standpoint, is one in which each pixel is given the value of the sample which is closest to it. This method can be thought of as a convolution of a sampled image with a rectangle function.

The cubic spline method is one in which interpolation is performed by means of calculating an equation of the form:

$$g(x) = \sum_k c_k u\left(\frac{x - x_k}{h}\right)$$

where the $c_k$'s are determined by solving a matrix equation in a manner well known to those skilled in the art. The kernel $u((x-x_k)/h)$ is, in terms of an arbitrary constant a:

$$u(s) = \begin{cases} (a+2)s^3 - (a+3)s^2 + 1 & 0 < s < 1 \\ as^3 - 5as^2 + 8as - 4a & 1 < s < 2 \\ 0 & 2 < s \end{cases}$$

where s is a variable in another coordinate system, having a different origin. The function g(x) is the convolution of the $c_k$'s with u(s).

The operation methods are briefly described. For illustrative convenience, one-dimensional interpolation is exemplified.

Figure 12A:
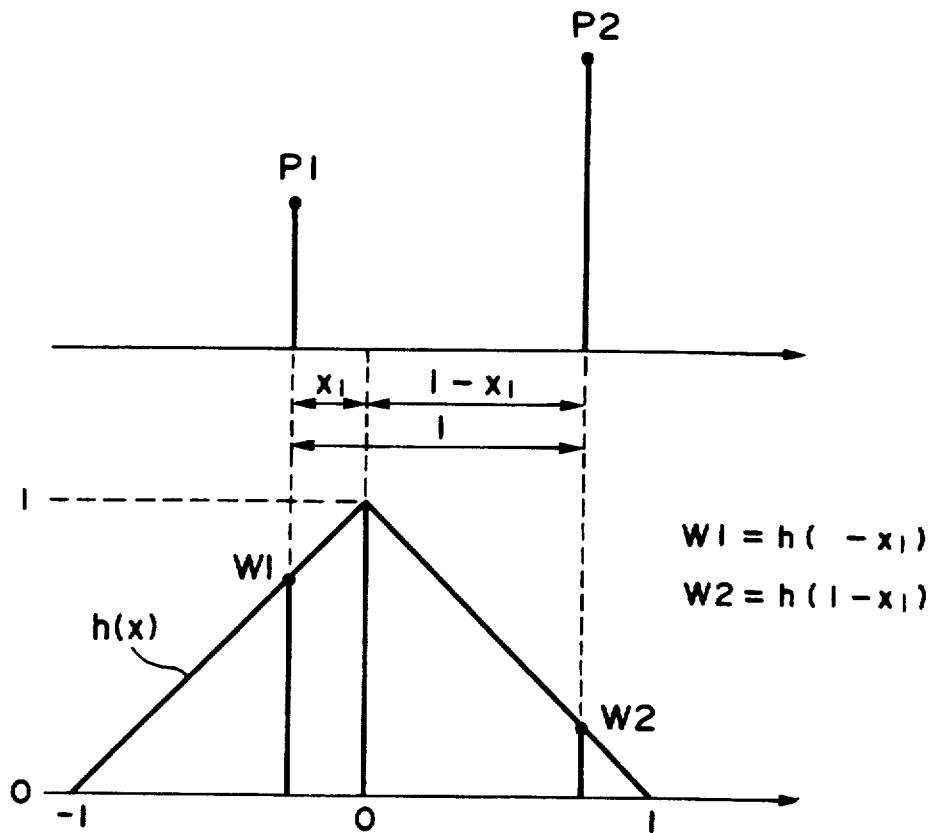
FIGS. 12(A) to 12(C) are charts showing the principle of linear interpolation.
Figure 12B:
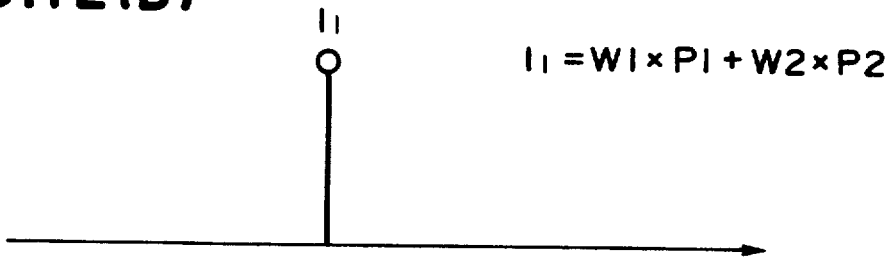
Figure 12C:
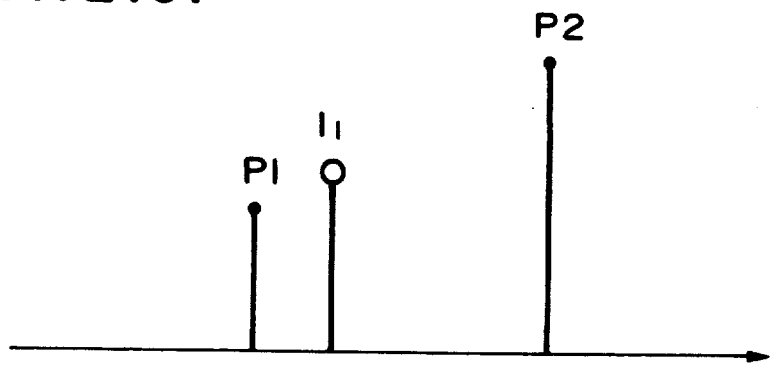

FIGS. 12(A) to 12(C) show a case wherein data of two points P1 and P2 are linearly interpolated to obtain interpolated data. Since data is a scalar value and has no dimension, no dimensions are assigned to the abscissa in FIGS. 12(A) to 12(C). If the data is defined as a function of time, the time is plotted along the abscissa. If the data is defined as a function of space, the position is plotted along the abscissa. FIG. 12(A) shows original data and an interpolation function h(x) (linear interpolation function in this case) used for obtaining interpolated data of point x1 from the original data and the position P1.

FIG. 12(B) shows interpolated data I1, and FIG. 12(C) shows a sum of the original data and the interpolated data. A distance between the points P1 and P2 is normalized as 1. In FIGS. 12(A) to 12(C), as a matter of fact, the following equations are derived:

$$I1 = W1 \times P1 + W2 \times P2 \quad (1)$$

$$W1 = h(-x1) \quad (2)$$

$$W2 = h(1-x1) \quad (3)$$

where W1 and W2 are weighting coefficients. Linear interpolation can be performed using data of two points (data of 4 (=2×2) points in the two-dimensional interpolation), as shown in FIGS. 12(A) to 12(C). Equations (1), (2), and (3) are established for any function h(x) as well as linear interpolation.

Figure 13A:
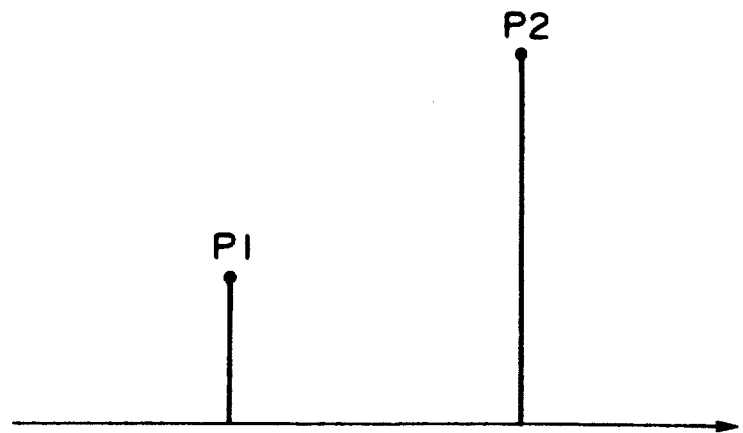
FIGS. 13(A) to 13(C) are charts showing another principle of interpolating the same data as in FIG. 12.
Figure 13B:
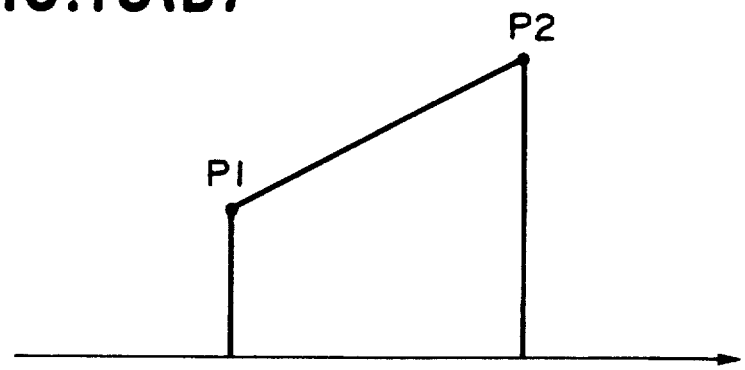
Figure 13C:
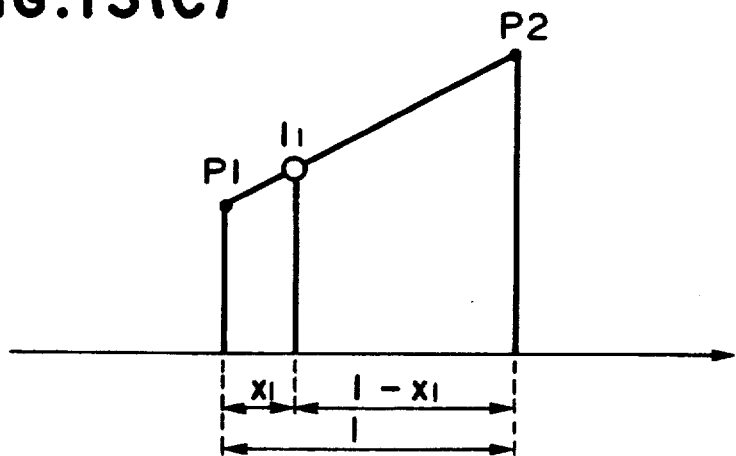

The operation in FIGS. 12(A) to 12(C) can be described in a manner as shown in FIGS. 13(A) to 13(C).

FIG. 13(A) is the same as FIG. 12(A) showing the original data. In FIG. 13(B), points P1 and P2 are connected by a line. In FIG. 13(C), a point x1 on the line P1, P2 is defined as interpolated interplated data I1. The method in FIGS. 12(A) to 12(C) is entirely the same as that in FIGS. 13(A) to 13(C). FIG. 13(B) shows a convolution between the data P1 and P2 and the interpolation function h(x) shown in FIG. 12(A). Therefore, the method in FIGS. 13(A) to 13(C) is a resampling method in which the original data and the interpolation function are convoluted, and the result is sampled at any point.

Figure 14:
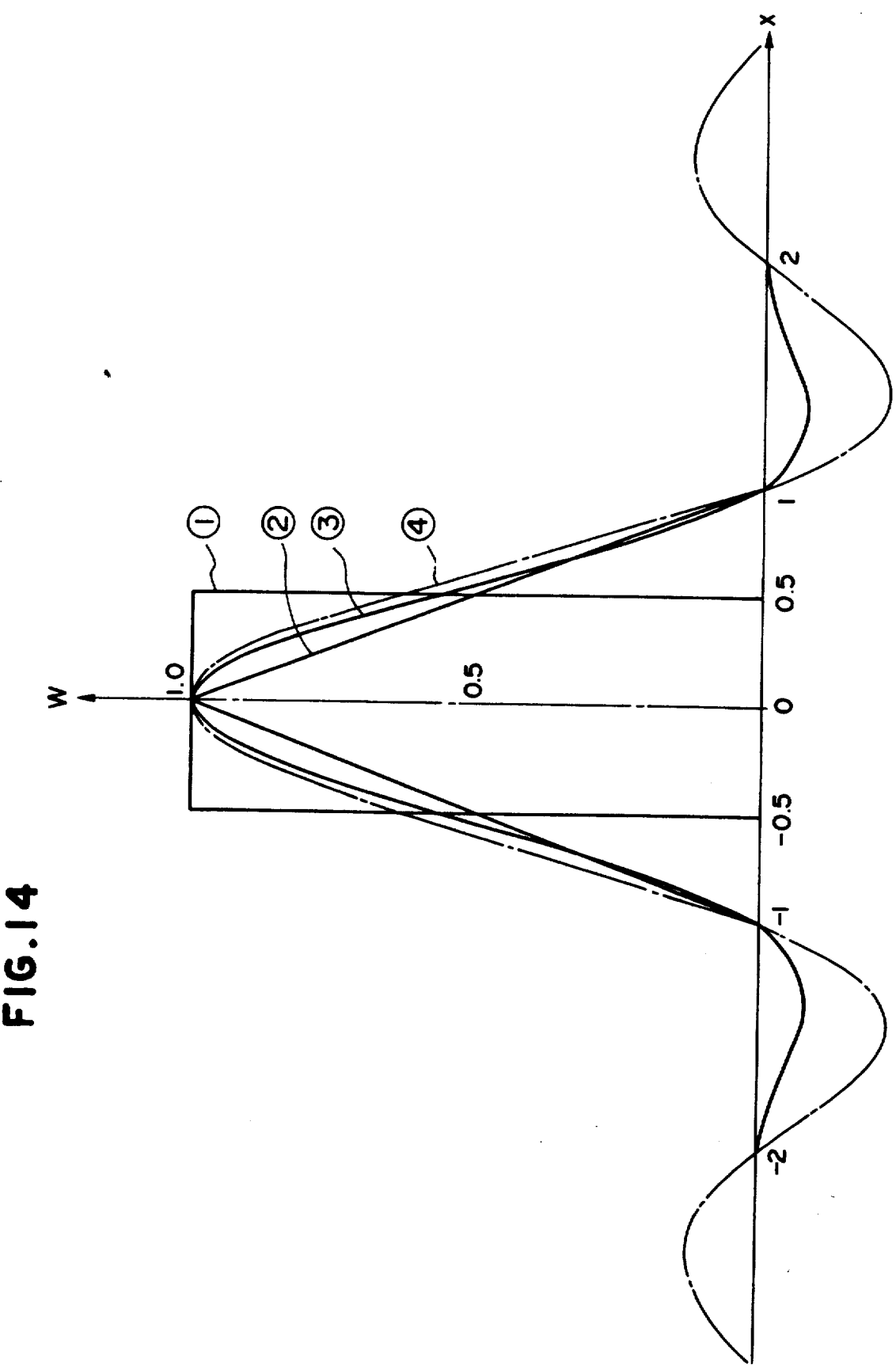
FIG. 14 is a graph showing various interpolation functions.

According to the resampling method, the transfer function by interpolation is the interpolation function itself. The transfer characteristics in the frequency region represent a spectrum of the interpolation function. FIG. 14 show various interpolation functions, and FIG. 15 show their spectra. Referring to FIGS. 14 and 15, ① represents the nearest neighbor interpolation, ② represents the bilinear interpolation, and ③ represents the cubic spline interpolation. In this case, $a = -0.5$ is given in the equations described in the previous references:

$$h(x) = (a + 2)|x|^3 - (a + 3)|x|^2 + 1$$
$$\quad 0 \leq |x| \leq 1 \quad (4)$$
$$= a|x|^3 - 5a|x|^2 + 8a|x| - 4a$$
$$\quad 1 \leq |x| \leq 2 \quad (5)$$
$$= 0 \quad 2 < |x| \quad (6)$$

④ represents a case of an ideal low-pass filter.

The original data is sampled (quantized) data. The upper limit of the frequency of the sampled data is defined as Nyquist rate $fN = 0.5\,fs$ where fs is the sampling frequency according to the known Nyquist theorem. The frequency is a time or spatial frequency according to the dimension used for reproducing the data since the data itself has no dimensions. In order to prevent degradation of the original data, the spectrum of the interpolation function is not preferably degraded within the range of 0 to fN.

As can be readily understood from the resampling method, the spectrum after interpolation is the one sampled by a resampling frequency fRS different from the original sampling frequency fs. Normal interpolation is performed to increase the density of data, so that condition fRS > fs is established. The spectrum is folded at $fRN = 0.5\,fRS > fN$ according to the sampling theorem.

When an interpolation of an integer multiple is to be performed, $fRS = n \times fN$ (n is a positive integer). Even if the spectrum is folded, no aliasing (folded distortion) occurs since the spectral phases are matched with each other. However, if an interpolation of a noninteger multiple is to be performed, $fRN \neq n \times fN$ is established. Aliasing occurs in a high-frequency spectral region higher than fN. Therefore, the spectrum of the interpolation function is preferably low at a frequency higher than fN. The optimal element which satisfies the above two conditions is an ideal low-pass filter ④ in FIG. 15. This interpolation function is a known SINC function, as shown by ④ in FIG. 15. However, since the SINC function is an infinitely spread function, calculations must be performed up to an infinite point. When these calculations are interrupted, a truncation error occurs as distortion caused by omission of the calculation regions. Therefore, the SINC function is not practical, and it is found that the three-dimensional interpolation ③ in the interpolation methods shown in FIGS. 14 and 15 is nearest to the ideal low-pass filter.

As is apparent from FIG. 14, ① requires a one-point calculation, ② requires two-point (four $(=2\times2)$ points in the two-dimensional interpolation) calculations, and ③ requires four-point (16 $(=4\times4)$ points in the two-dimensional interpolation) calculations. These calculations are performed by computer software in the conventional apparatus. When interpolation processing is performed by a computer, an additional memory for storing calculated data is required in addition to the memory for storing the original data. For example, if the number of image data after interpolation represent $4,000 \times 5,000$ pixels, the capacity of the memory is 20 Mwords. In addition, when interpolated data is used for display or a hard copy, the IC memory must be used because the memory storing the interpolated data is subjected to high-speed read access. In this case, since the interpolated data need not be retained after the display or hard copy, the IC memory is temporarily used. A 20-Mword IC memory is expensive and has a large size. Furthermore, a long operation time is required, resulting in an impractical application. Therefore, when the interpolated data is used for the display or hard copy, the data is preferably pipeline-processed. However, the conventional pipeline processing apparatus can perform interpolation of an integer multiple, but cannot perform interpolation of a noninteger multiple.

Figure 16A:
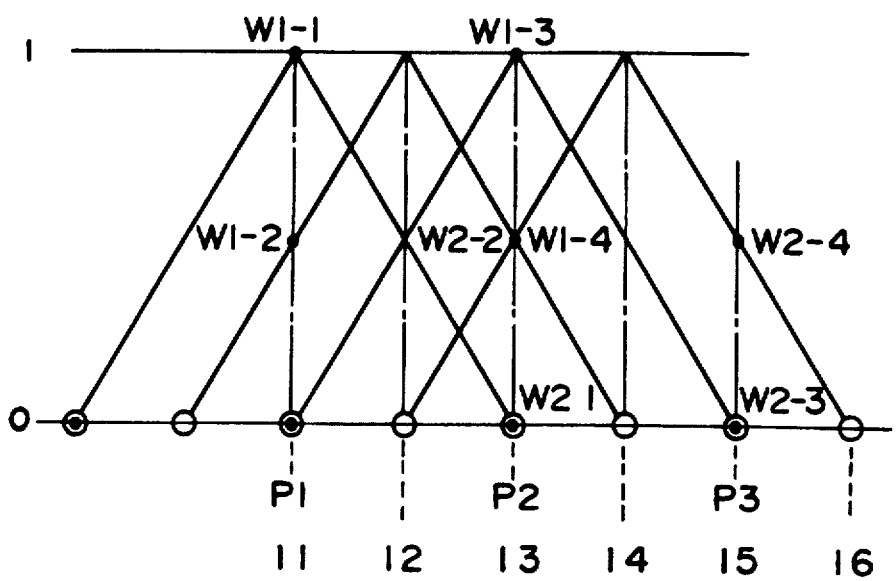
FIGS. 16(A) and 16(B) are charts showing interpolation of an integer multiple and interpolation of a no-ninteger multiple so as to explain the relationship between the data positions and the weighting coefficients when linear interpolation is performed.
Figure 16B:
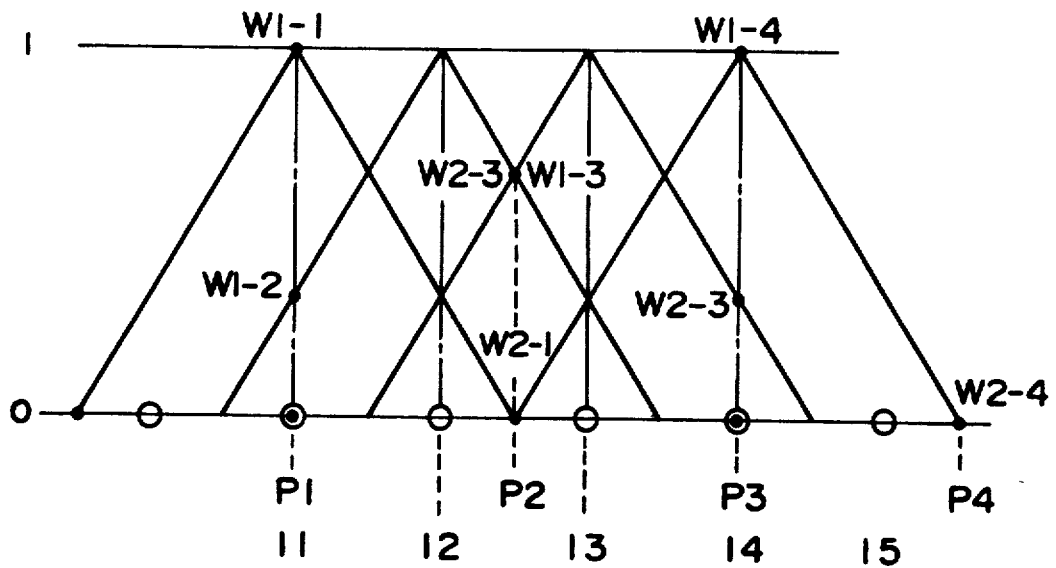

For example, FIG. 16(A) shows a case wherein original data is linearly interpolated by two times, and FIG. 16(B) shows a case wherein original data is linearly interpolated by 1.5 times. Solid points represent positions of data P1 to P3, and hollow points represent positions of interpolated data I1 to I6. FIGS. 16(A) and 16(B) show the relationship between the data points and the weighting coefficients.

In linear interpolation by two times in FIG. 16(A), $$I1 = W1-1 \times P1 + W2-1 \times P2 \quad (7)$$

$$I2 = W1-2 \times P1 + W2-2 \times P2 \quad (8)$$

$$I3 = W1-3 \times P2 + W2-3 \times P3 \quad (9)$$

$$I4 = W1-4 \times P2 + W2-4 \times P3 \quad (10)$$

In this case, $$W1-1 = W1-3 = 1 \quad (11)$$

$$W2-1 = W2-3 = 0 \quad (12)$$

$$W1-2 = W2-2 = W1-4 = W2-4 = \tfrac{1}{2} \quad (13)$$

The interpolated data I1 and I2 and the interpolated data I3 and I4 are calculated by using the same original data, respectively. When an interpolation is performed twice, the speed of the original input data input to the operation circuit is $\tfrac{1}{2}$ that the interpolated output data. Similarly, the speed is changed when an interpolation of an integer multiple is performed and the integer multiple is changed. However, since the predetermined speed is used, a conventional pipeline apparatus can relatively easily perform the above operations.

In an interpolation by 1.5 times in FIG. 16(B), $$I1 = W1-1 \times P1 + W2-1 \times P2 \quad (14)$$

$$I2 = W1-2 \times P1 + W2-2 \times P2 \quad (15)$$

$$I3 = W1-3 \times P2 + W2-3 \times P3 \quad (16)$$

$$I4 = W1 - 4 \times P3 + W2 - 4 \times P4 \qquad (17)$$

In this case, $$W1 - 1 = W1 - 4 = 1 \qquad (18)$$

$$W2 - 1 = W2 - 4 = 0 \qquad (19)$$

$$W1 - 2 = W2 - 3 = \tfrac{2}{3} \qquad (20)$$

$$W1 - 3 = W2 - 2 = \tfrac{1}{3} \qquad (21)$$

The combinations of the identical original data referred during operations are (I1,I2), (I3), (I4,I5), (I6), .. .. When the speed of the interpolated data output from the operation circuit is predetermined, the speed of the input original data cannot be predetermined. However, if the input speed is predetermined, the output speed cannot be predetermined. Therefore, it is difficult to perform interpolation of a noninteger multiple in a conventional pipeline operation unit.

Figure 25A:
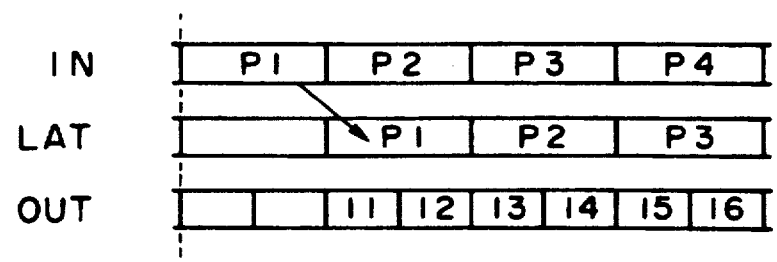
FIGS. 25(A) to 25(C) show data formats for explaining a technique for calculating an interpolation magnification.
Figure 25B:
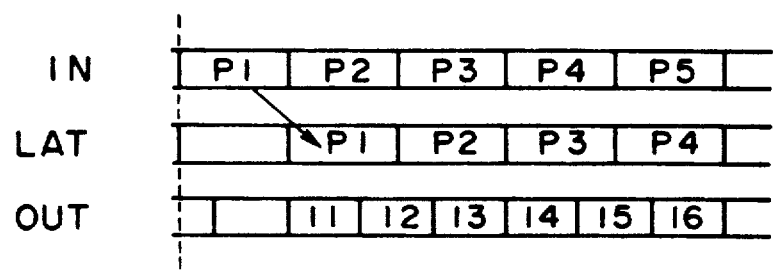
Figure 25C:
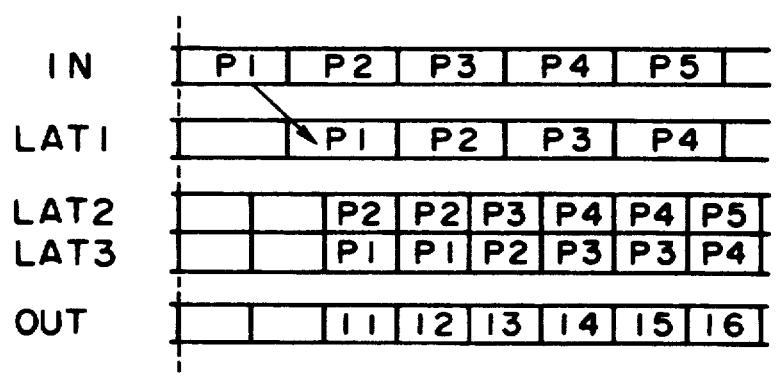

The data flows described above are shown in FIGS. 25(A) to 25(C). The input data flows in FIGS. 25(A) to 25(C) are represented by IN, the flows of latched data are represented by LAT, LAT1, LAT2, and LAT3, and the flow of output data is represented by OUT. The time lapse direction is the right direction in FIGS. 25(A) to 25(C).

Interpolation of Integer Multiple

FIG. 25(A) shows an interpolation of an integer multiple. In the same manner as in equations (7) to (10), the data is interpolated twice. The data flows IN and LAT in FIG. 25(A) are timed in response to the same input clocks, while the data flow OUT is timed in response to output clocks having a frequency twice that of the input clocks. The data flow LAT is used to latch data of the flow IN. Data I1 to I6 can be calculated according to equations (7) to (10). If the interpolation rate is an integer multiple, the same operation as in FIG. 25(A) can be performed.

Interpolation of Noninteger Multiple

FIG. 25(B) shows a case in which an interpolation by 1.5 times is performed in the same manner as in equations (14) to (17) when the LAT is timed in response to the input clocks in the same manner as in FIG. 25(A). The output clocks in FIG. 25(B) have a frequency 1.5 times that of the input clocks. As is apparent from FIGS. 25(A) and 25(B), data I1, I3, and I4 can be calculated according to equations (14), (16), and (17), and data I6 can also be calculated. However, data I2 cannot be calculated according to equation (15). Similarly, data I5 cannot be calculated either. In order to calculate data I2 and I5, the latches are added, as shown in FIG. 25(C). In this case, the data flows IN and LAT are timed in response to the input clocks and the data flows LAT2, LAT3, and OUT are timed in response to output clocks. The data flows LAT1 and LAT2 are obtained by latching the data of the data flow IN. The data flow LAT3 is obtained by latching the data of the data flow LAT1. In this manner, all data I1 to I6 can be calculated.

The above technique requires two types of clocks having different frequencies, i.e., the input and output clocks which must be synchronized. When interpolation operations at various magnifications are performed, the frequencies vary depending on the magnifications. Therefore, hardware for generating the clocks corresponding to the magnifications is required. In addition, FIG. 25(C) shows one-dimensional operation in the mainscan direction. However, when a two-dimensional image is to be interpolated, the same processing as in FIG. 25(C) must also be performed in the sub-scan direction. Two additional types of clocks are required in the subscan direction. In addition, the clocks along the mainscan direction must be synchronized with those along the sub-scan direction. It is difficult to generate high-precision clocks by such a clock generator.

Figure 1:
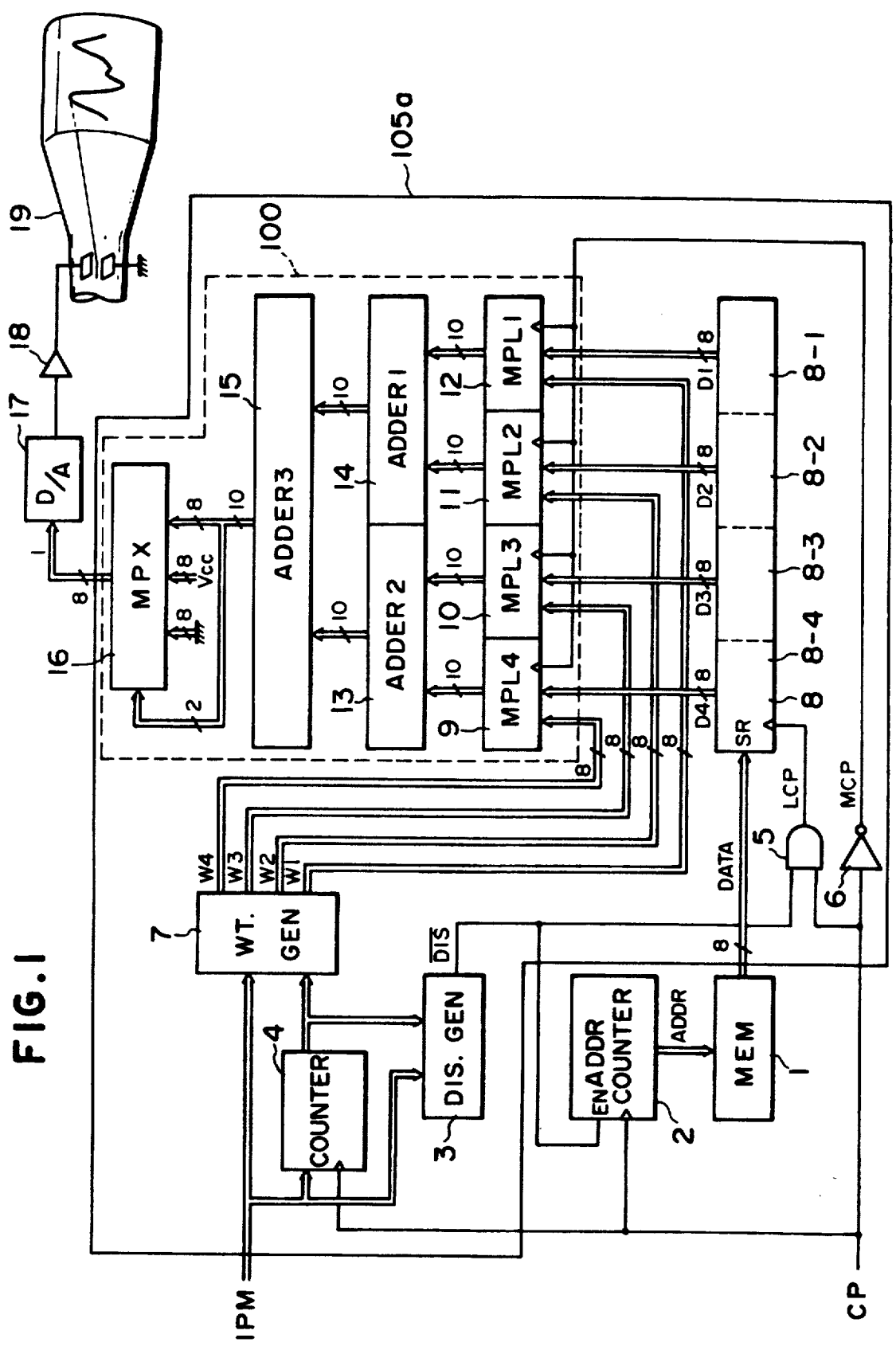
FIG. 1 is a block diagram of a data processing apparatus including a pipeline operation unit for performing one-dimensional interpolation processing.
Figure 2:
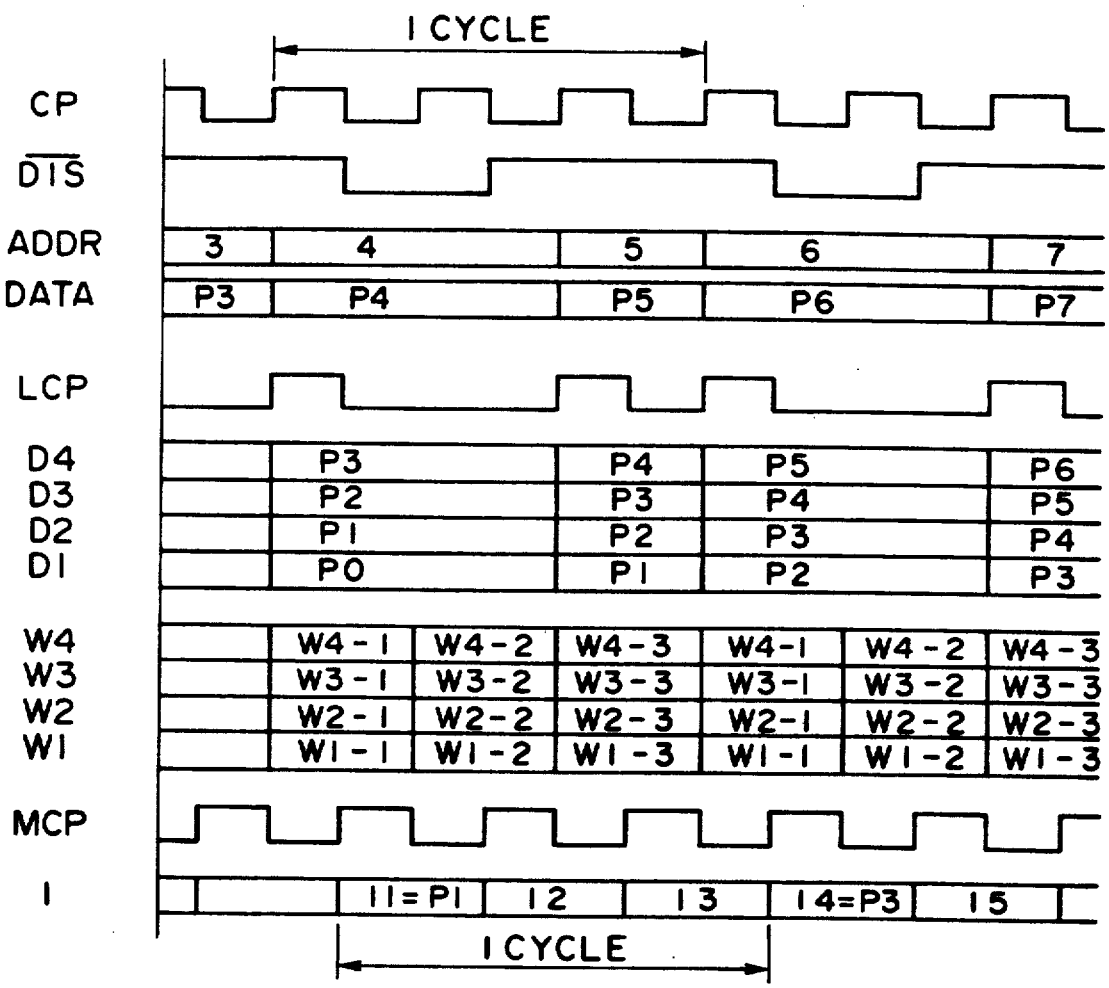
FIG. 2 is a timing chart showing signals of the circuit components of FIG. 1 and data flows.
Figure 3A:
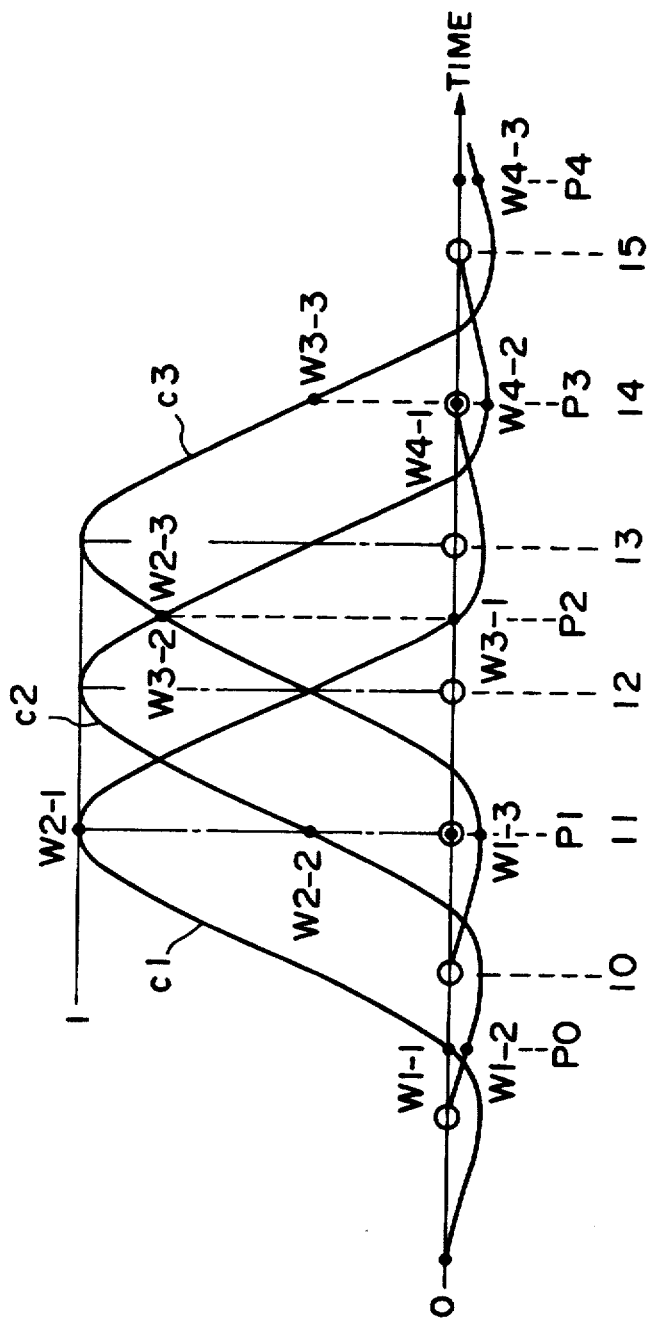
FIGS. 3(A) and 3(B) are charts showing the relationship between data positions and weighting coefficients when three-dimensional (cubic spline) interpolation is performed.
Figure 3B:
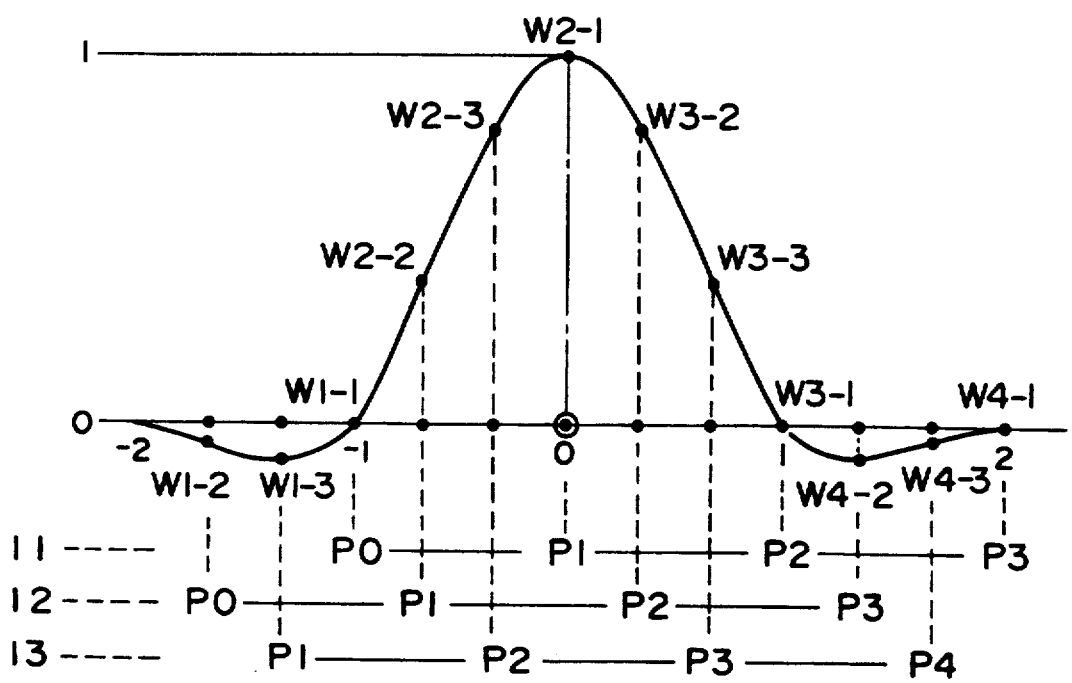

FIG. 1 is a block diagram of a data processing apparatus including the pipeline operation unit 105 for interpolating one-dimensional data train according to the embodiment of the present invention, exemplifying an application of the present invention to oscillography. FIG. 2 is a timing chart showing signal waveforms and data flows in the circuit components in FIG. 1. In this case, 1.5-time interpolation is performed. The data processing apparatus can perform three-dimensional interpolation represented by equations (4), (5), and (6), and an arithmetic and logic unit 100 includes 4-point weighting multipliers (MPL4, MPL3, MPL2, and MPL1) 9 to 12. FIG. 3(A) shows the same three-dimensional interpolation as in FIGS. 16(A) and 16(B). FIG. 3(B) shows the relationship between the original data positions and the weighting coefficients when the interpolation data position is normalized as the center. FIGS. 1 and 2 show a case when the output data flow is obtained at a constant speed by controlling the data flow input to the arithmetic and logic unit 100.

As is apparent from FIGS. 3(A) and 3(B), the operations are performed in the same manner as in equations (14) to (17):

$$I1 = W1 - 1 \times P0 + W2 - 1 \times P1 + W3 - 1 \times P2 + W4 - 1 \times P3 \qquad (22)$$

$$I2 = W1 - 2 \times P0 + W2 - 2 \times P1 + W3 - 2 \times P2 + W4 - 2 \times P3 \qquad (23)$$

$$I3 = W1 - 3 \times P1 + W2 - 3 \times P2 + W3 - 3 \times P3 + W4 - 3 \times P4 \qquad (24)$$

The operation sequence for data I4 and subsequent data is the same as that for the data I1 to I3.

A memory (MEM) 1 in FIG. 1 stores data sampled by another means (not shown). Data accessed by address data from an address counter (ADDR COUNTER) 2 is read out from the memory 1. The address counter 2 counts up the address in response to a clock signal CP. However, when an output $\overline{\text{DIS}}$ from a control signal generator (DIS. GEN) 3 is at low level, the address counter 2 does not count the address. This can be easily achieved by supplying the signal $\overline{\text{DIS}}$ to the enable input terminal of the counter IC. Output DATA(Pn) from the memory 1 becomes an irregular data flow. As is apparent from FIG. 2 and FIGS. 3(A) and 3(B), in 1.5-time interpolation, the flow of the output DATA(Pn), the signal $\overline{\text{DIS}}$ and the weighting coefficient (W1−m) have a cycle of three clocks. A counter 4 for controlling the control signal generator 3 and a weighting generator (WT. GEN) 7 is a ternary counter or a counter of a multiple of 3. The counter 4 serves as a counter of a numerator or an integer multiple thereof when a magnification is represented by a fraction. For example, "1.5 times" can be represented as 3/2, so that the counter 4 serves as a counter of base-3 or a multiple of 3. The cycle can be changed in accordance with the interpolation magnification. A mode signal IPM for determining a magnification is input to the counter 4 and the weighting generator 7 to select a cycle and a weighting coefficient. The signal $\overline{DIS}$ is obtained by decoding an output from the counter 4 and delaying the decoded result by a ½ clock. A signal waveform of the clock signal is preferably prestored in a memory for better flexibility.

The output DATA(Pn) from the memory 1 is stored in a shift register 8. The shift register 8 is controlled led by an output LCP from a gate 5. The output LCP is obtained by gating the signal $\overline{DIS}$ in response to the clock signal CP and has a waveform having pulse omissions, as shown in FIG. 2. Data 8-1 to 8-4 are shifted in the shift register 8. In this case, the data 8-1 is the oldest and the data 8-4 is the newest. The data 8-1 to 8-4 show irregular variations as a function of time in synchronism with the output signal LPC, as shown in FIG. 2. The shift register 8 may be arranged as cascade-connected latches. Assume that the output DATA(Pn) comprises 8-bit data. Eight 1-bit shift registers are required, or four 8-bit latches are required. Use of latches is more advantageous than that of shift registers. Therefore, the shift register 8 is referred to as a latch 8. Outputs D1 to D4 from the latch 8 are supplied to first input terminals of the multipliers 9 to 12. The second input terminals of the multipliers 9 to 12 receive weighting coefficients W1 to W4 as outputs from the weighting generator 7, respectively. Since the normal multiplier IC includes latches therein, a clock signal MCP is input to the multipliers 9 to 12. The clock signal MCP is obtained by inverting the clock signal CP by an inverter 6. After the outputs D1 to D4 and the weighting coefficients W1 to W4 are specified, the clock signal MCP is latched by the multipliers 9 to 12. In commercially available multiplier ICs such as a 16-bit MPY-16H available from TRW, U.S.A., a pin-compatible ADSP-1016 available from Analog Devices, and an IDT7216 available from IDT. The output from such a multiplier IC is delayed by one clock from the input. However, in order to readily understand the circuit operation in FIG. 2, one-clock delay times of the multipliers 9 to 12 are neglected.

The outputs from the multipliers 9 and 10 and the multipliers 11 and 12 are added by adders (ADDER 2 and ADDER1) 13 and 14, sums therefrom are added by an adder (ADDER3) 15, and an output from the adder 15 is then input to a multiplexer (MPX) 16. If the outputs W1 to W4 from the weighting generator 7 comprise 8-bit data outputs, respectively, the outputs from the multipliers 9 to 12 are 16-bit data outputs, respectively. However, when the number of bits of the outputs from the multipliers 9 to 12 is minimum, the number of ICs of the adders 13 to 15 is accordingly minimized. The numbers of bits of the weighting coefficients W1 to W4 and the data input to the adders 13 to 15 are determined on the basis of round-down and truncation allowances.

Since negative calculations and a carry can be performed in the above arithmetic operations, a 1-bit sign bit representing the positive or negative value and a 1-bit overflow bit representing a carry are required. For example, if three-dimensional interpolation of FIG. 3 is assumed, the weighting coefficients W1 and W4 are negative, and the multipliers 9 and 12 perform negative multiplications. Normally, twos complement is employed. An output from the adder 15 has the number of bits larger by 2 bits than the number of bits of the input data. The most significant bit of the output from the adder 15 is a sign bit and the next bit is an overflow bit. Therefore, the two upper bits are used as selection bits, and the multiplexer 16 performs negative processing and overflow processing. More specifically, when a negative underflow occurs in the multiplexer 16, logic "0" is selected. However, if an overflow occurs, a maximum value (FF in the hexadecimal notation if data is 8-bit data) is selected.

As output I from the multiplexer 16 is converted by a D/A converter 17 into an analog signal. The analog signal is amplified by an amplifier 18, and the amplified signal drives the vertical deflection electrode in a CRT 19. Electron beams in the CRT 19 are scanned horizontally by the horizontal deflection electrode at a predetermined speed, and a waveform proportional to the output from the amplifier 18 can be obtained. The delay of the output I from the multiplexer 16 is neglected in FIG. 2. However, in practice, the data is delayed by the arithmetic and logic unit 100. A latch synchronized with the clock signal CP is normally inserted between the multiplexer 16 and the D/A converter 17 but is omitted in FIG. 1. The data processing apparatus of this embodiment is not limited to the final output device. However, the output device 19 may be an electromagnetic oscilloscope, a printer, or the like.

Figure 4B:
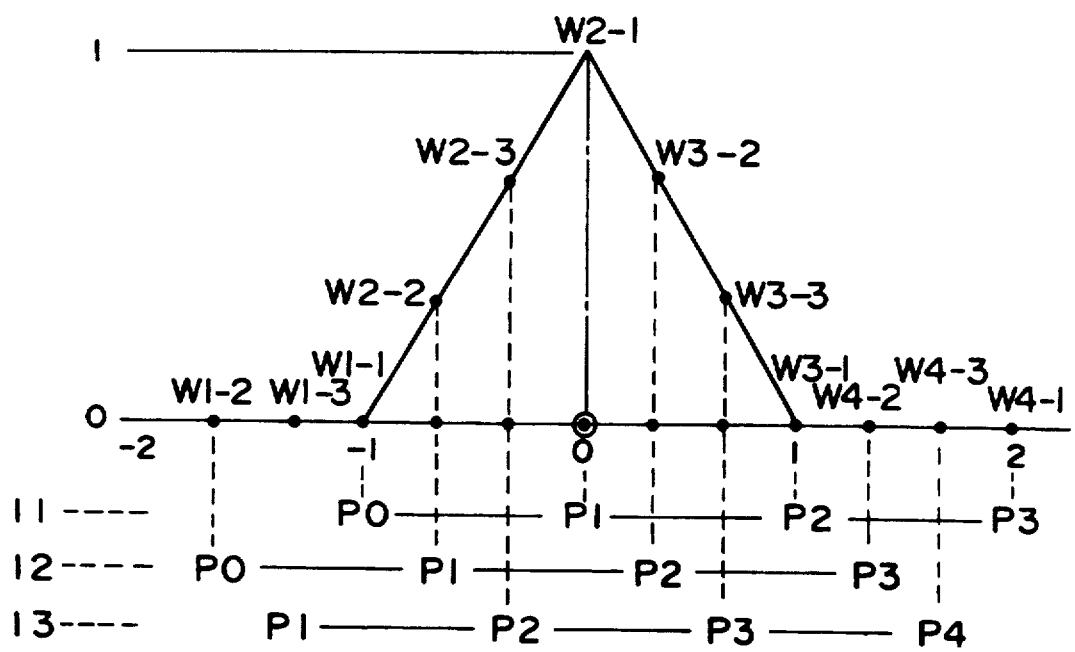
Figure 5A:
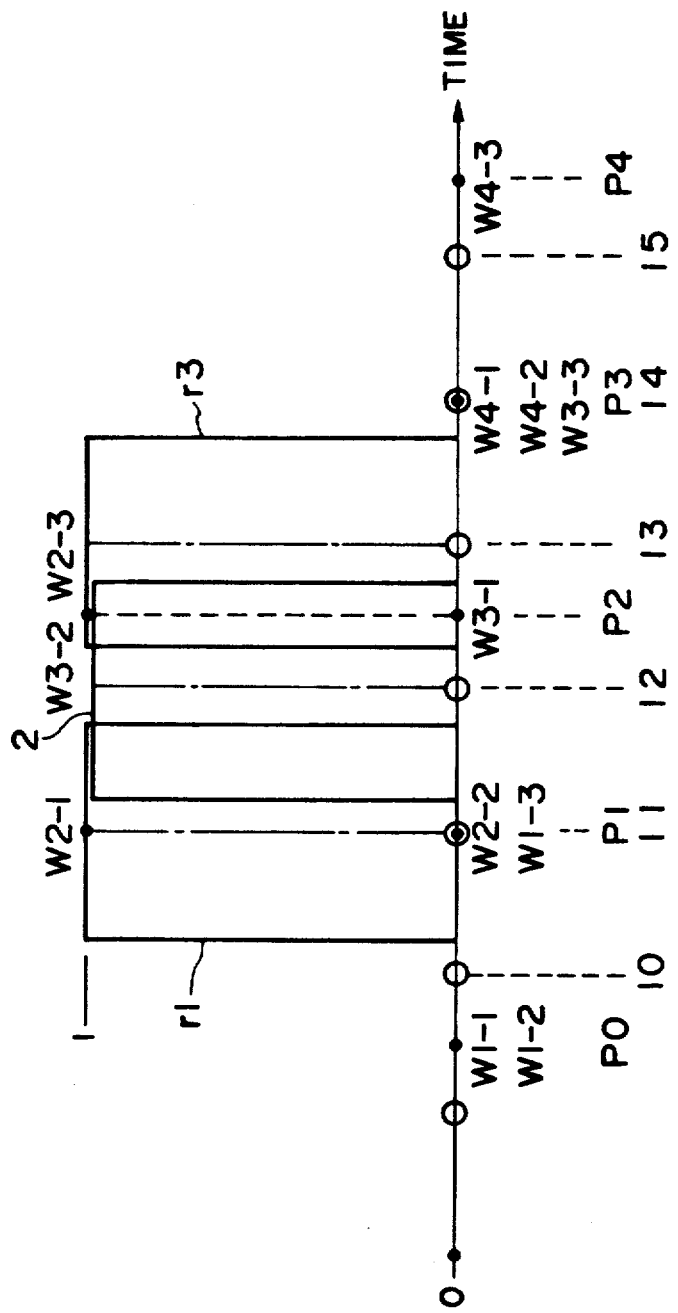
FIGS. 5(A) and 5(B) are charts showing the relationship between the data positions and the weighting coefficients when an interpolation between the nearest components (nearest neighbor) is performed.
Figure 5B:
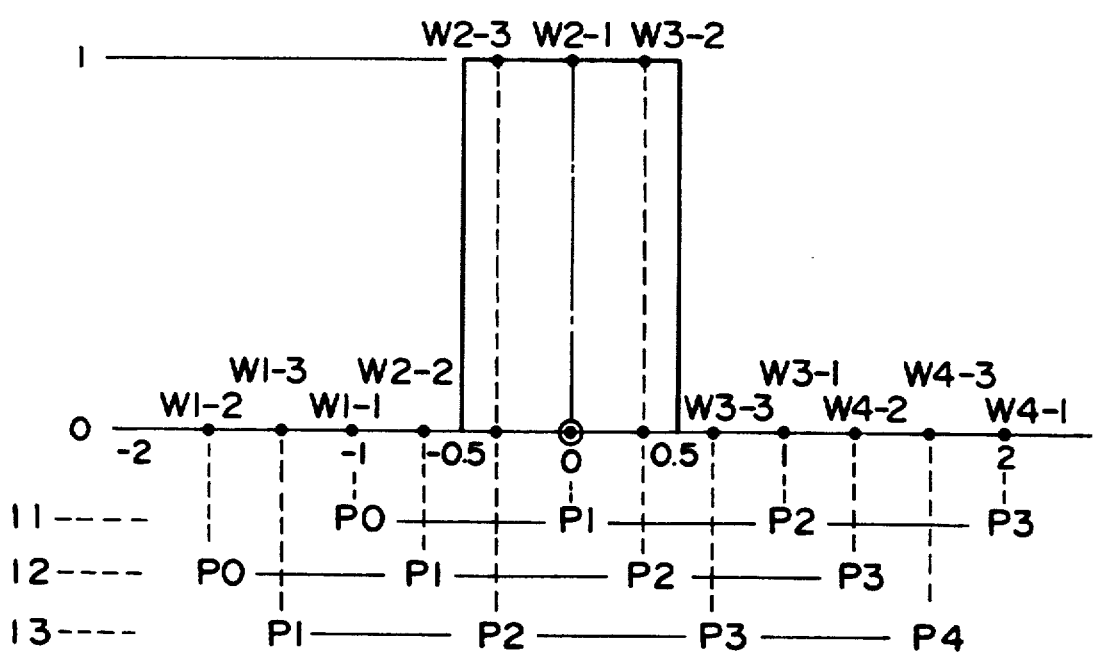

The linear interpolation in FIG. 4 is performed by arithmetic operations of two points. However, the interpolation of nearest neighbors shown in FIG. 5 requires an arithmetic operation of only one point. If W1=W4=0 is established in the arithmetic and logic unit in FIG. 1, two-point arithmetic operations can be performed according to equations (22) to (24). If conditions W1=W4=0 is always established and one of W2 and W3 is zero, one-point arithmetic operations can be performed. If only the original data is to be output, the interpolation of nearest neighbors is required. When the weighting coefficients W1 to W4 are properly changed, arithmetic operations for any value of a can be performed according to equations (4) to (6). If an algorithm mode is included in the data of the IPM input to the weighting generator 7 and a weighting coefficient is selected according to the algorithm mode, any algorithm can be selected. The control signal generator 3 and the weighting generator 7 may be constituted by a ROM for storing permanent magnification and algorithm mode programs. However, the control signal generator 3 and the weighting generator 7 may be constituted by a RAM. In this case, the signal DIS and the coefficients W1 to W4 of an arbitrary mode are written in the control signal generator 3 and the weighting generator 7 in the RAM before the processing apparatus is operated under the control of the microcomputer.

Figure 6:
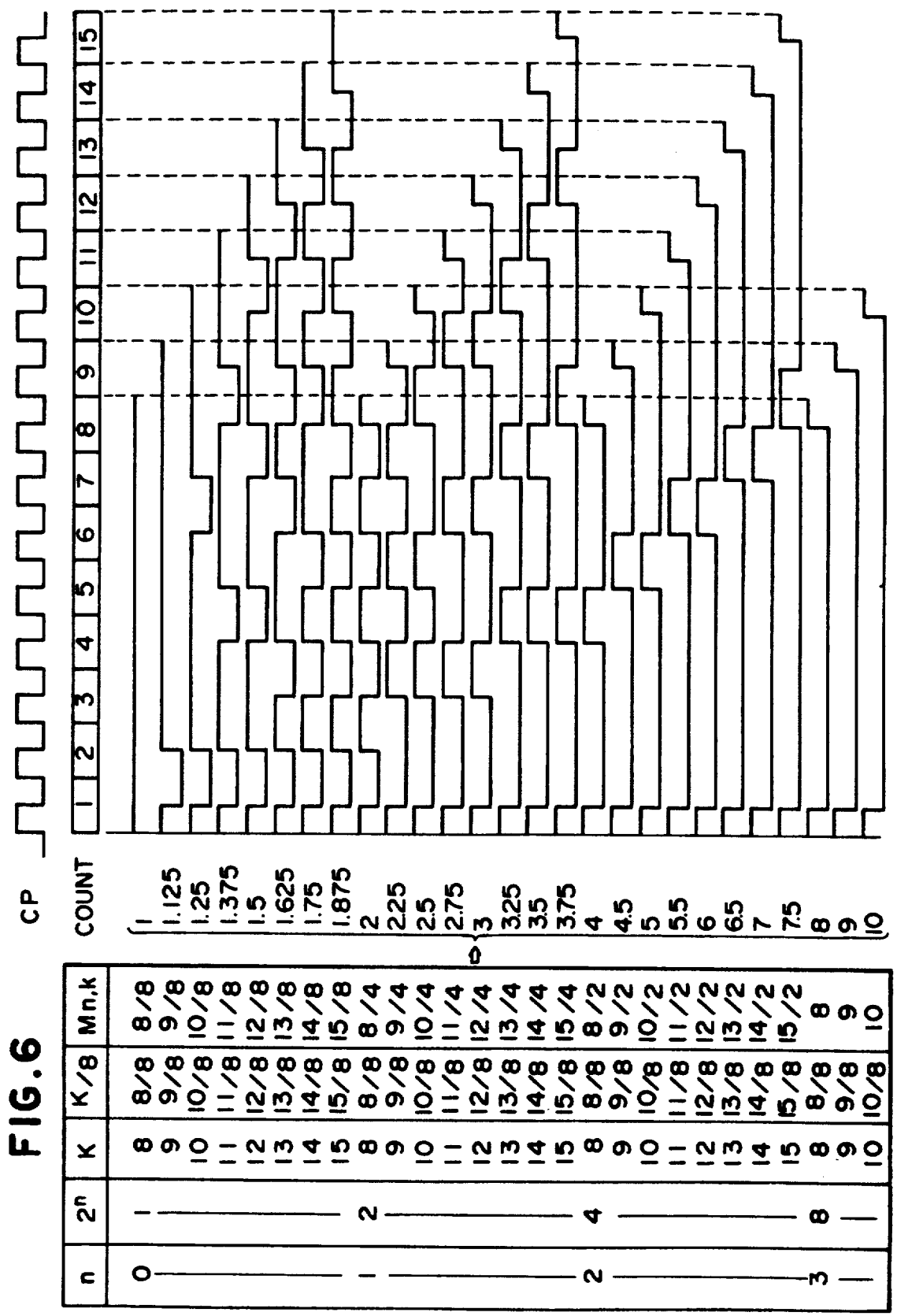
FIG. 6 is a timing chart showing various interpolation magnifications of the signals for controlling the data flows.

FIG. 6 shows various signals DIS for interpolation operations at various magnifications. A table in the left position in FIG. 6 is used for explaining calculations of interpolation magnifications (to be described later). "3/2 times" is represented as 12/8 times in FIG. 6. With this arrangement, the regularity of the cycle of the signal $\overline{DIS}$ upon changes in magnifications can be improved. As is apparent from FIG. 6, there are no differences between the integer multiple and the noninteger multiple. The signal $\overline{DIS}$ depends on the magnification mode, but not on the algorithm mode. If the arithmetic and logic unit in FIG. 1 is expanded, arithmetic operations of 4 or more points can be performed. Filter operations may also be performed in addition to the interpolation operations. This processing apparatus is also effective for processing statistical data.

Another Embodiment

In the arrangement of FIG. 1 and its operation of FIG. 2, the data flow input to the arithmetic and logic unit is controlled to set the output data flow at a constant speed. According to the technical scope of the present invention, the output data flow can be controlled to set the input data flow at a constant speed. In this case, in the arrangement of FIG. 1, a half of the speed of the output DATA(Pn) from the memory 1, i.e., the output ADDR of the address counter 2 is shifted by one bit. Alternatively, the address counter 2 should not be controlled by the output DIS from the control signal generator 3, or the gate 5 is omitted and the input to the latch circuit 8 is given as the clock signal CP.

Timing Chart

Figure 7:
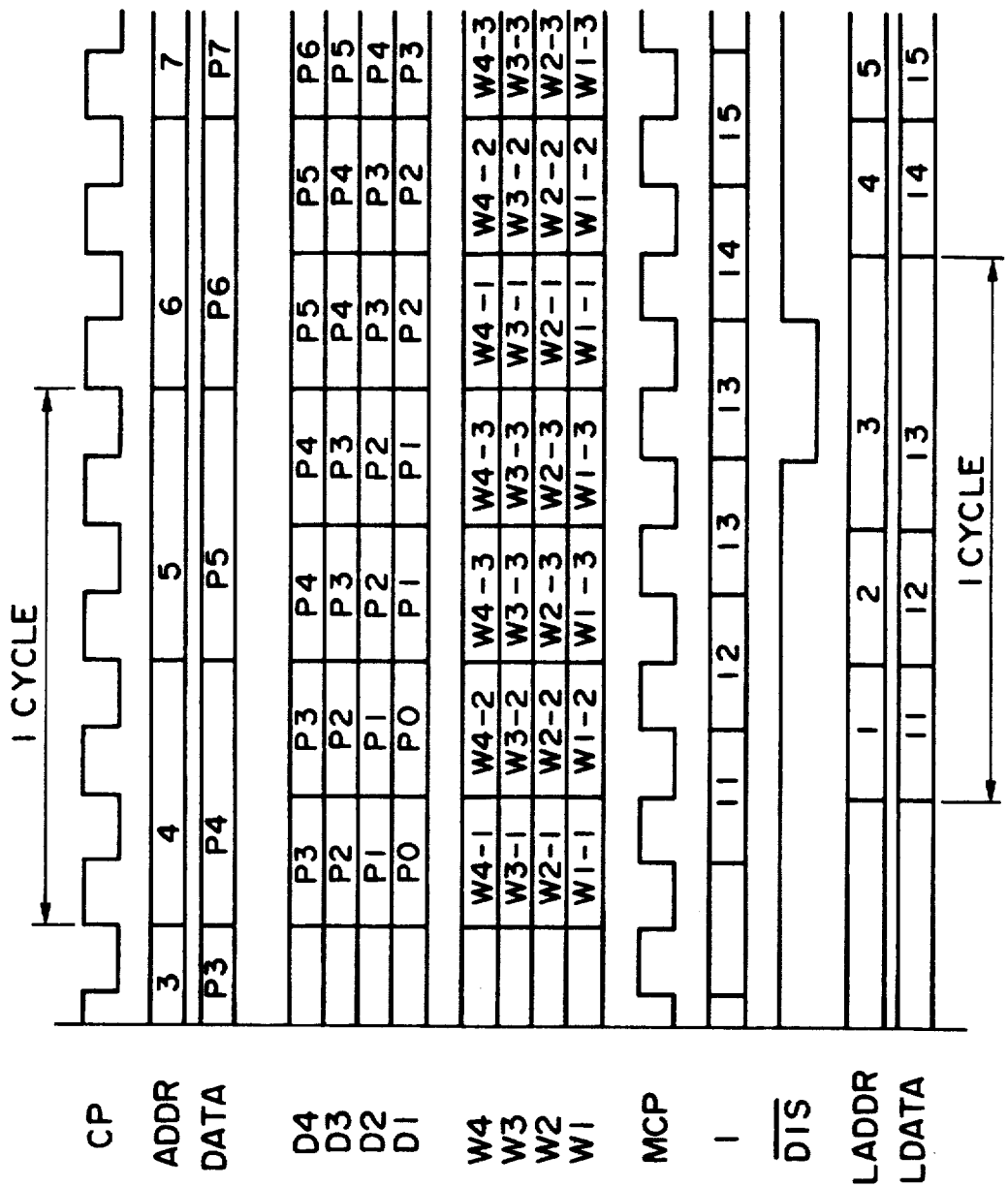
FIG. 7 is a timing chart showing the signals of the respective circuit components of the apparatus and the data flows when the apparatus shown in FIG. 1 is partially modified.

A timing chart of the circuit arrangement is shown in FIG. 7. Referring to FIG. 7, the clock of the latch circuit 8 is the clock signal CP. However, a clock signal which is obtained by dividing the frequency of the clock signal CP into halves may be used. The weighting generator 7 outputs the weighting coefficients W1-3 to W4-3 twice. However, another address counter may be arranged to control the weighting coefficient and may be controlled to prolong the durations of the weighting coefficients W1-3 to W4-3. In this embodiment, the data flow output from the arithmetic and logic unit 100 is not constant. In order to achieve the constant speed, a line memory is arranged, and an address counter for the line memory is controlled in response to the signal $\overline{DIS}$ in FIG. 7. Data is written in the line memory by jumping the addresses, as shown in FIG. 7. When the written data is read out at a constant speed, a data train having a constant speed can be obtained. If data are continuously output, the write/read access of the two line memories are alternately performed. Alternatively, operations and writing are performed during the blanking period of the CRT 19. In this case, only one line memory is required. As is apparent from FIG. 7, one cycle consists of four clock pulses. The processing speed is lower than that shown in FIGS. 1 and 2. The embodiment shown in FIGS. 1 and 2 is better than that of FIG. 7.

Block Diagram of Two-Dimensional Data Processing Apparatus

Figures 8, 8A:
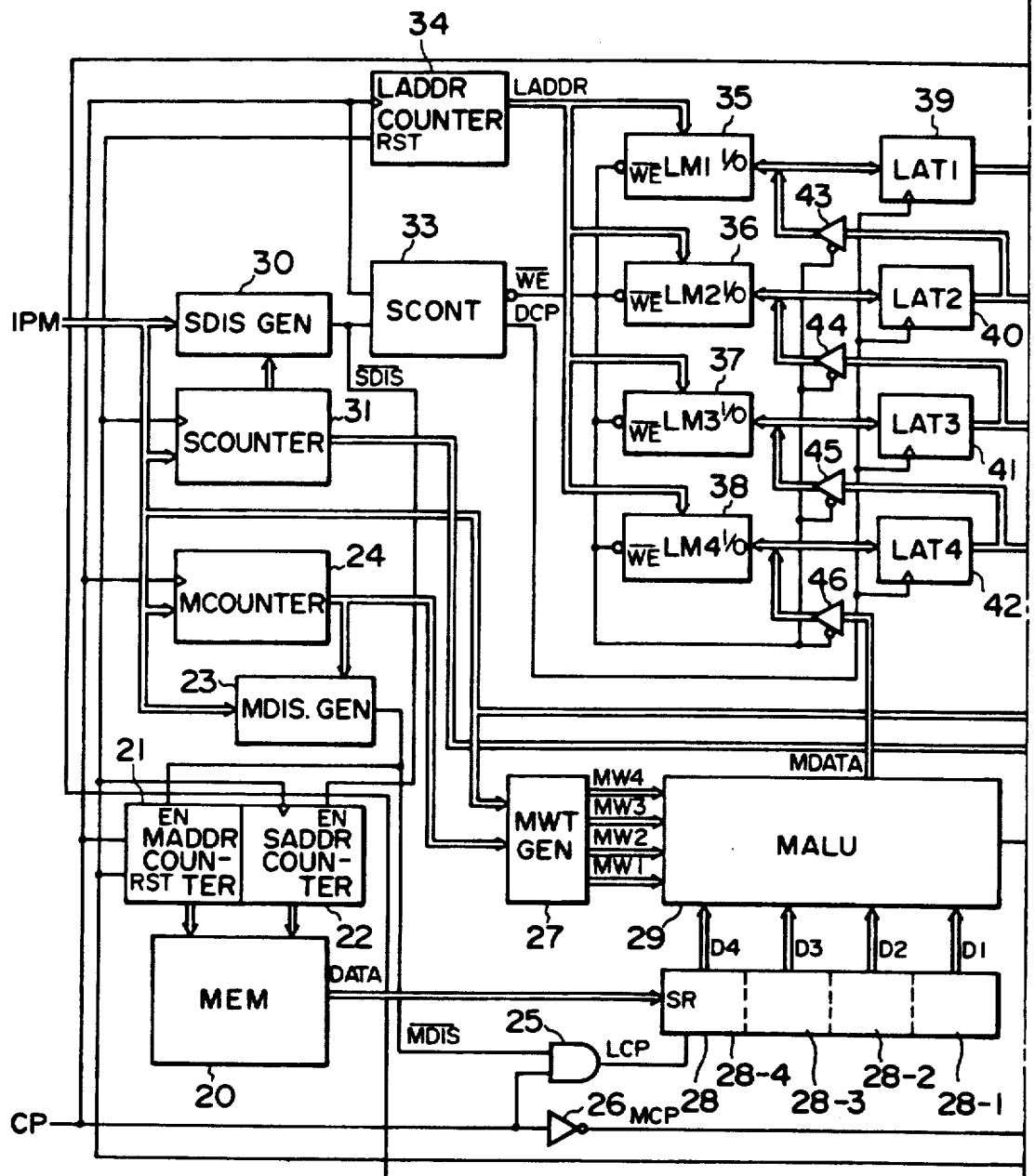
FIGS. 8, 8(a), 8(b) are block diagram of an apparatus when the apparatus shown in FIG. 2 is applied to two-dimensional interpolation processing.
Figure 9:
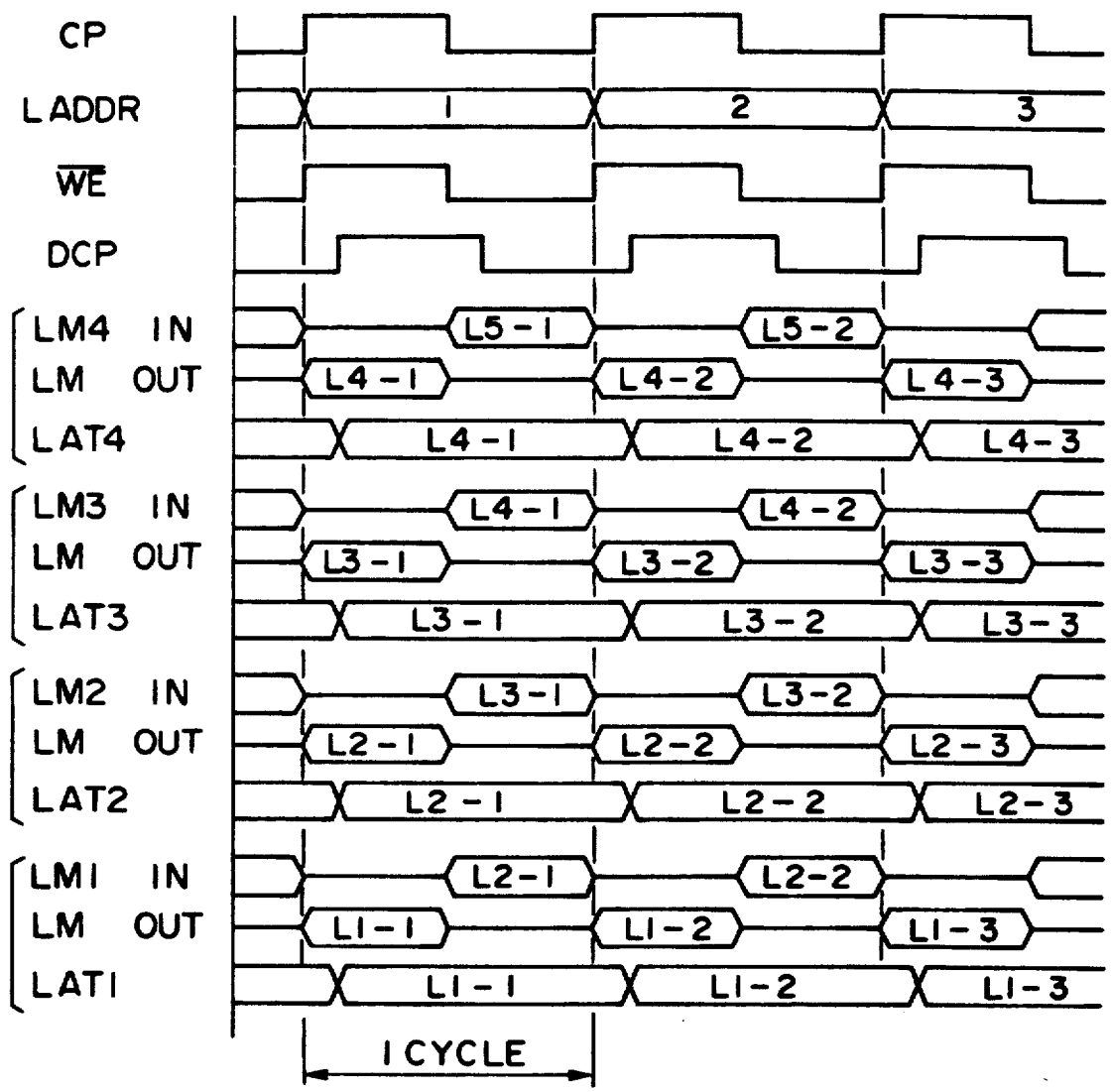
FIG. 9 is a timing chart for explaining data transfer in the sub-scan direction in FIG. 8.
Figure 10:
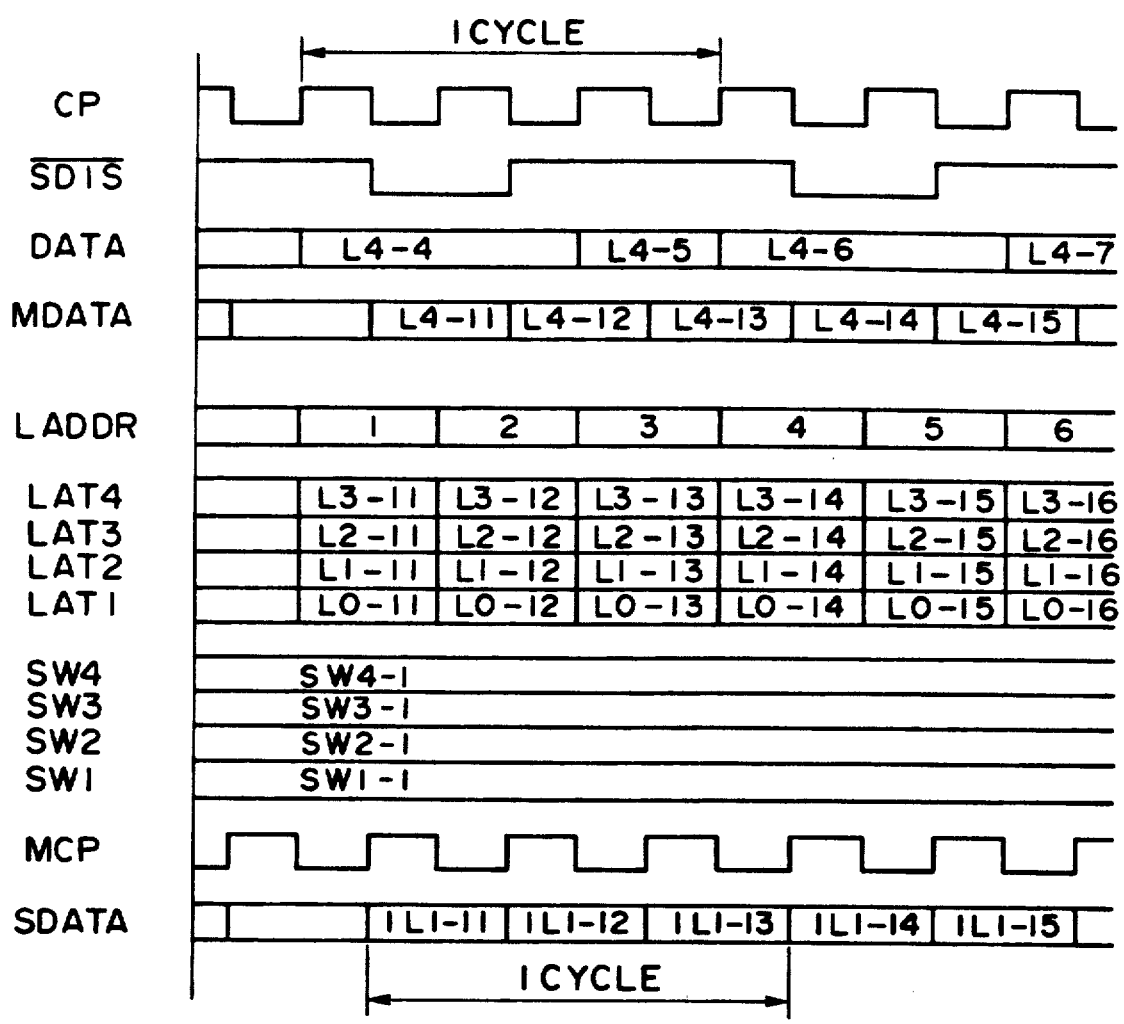
FIG. 10 is a timing chart showing signals of the circuit components of the apparatus in FIG. 8 and the data flows in the main-scan direction.
Figure 11:
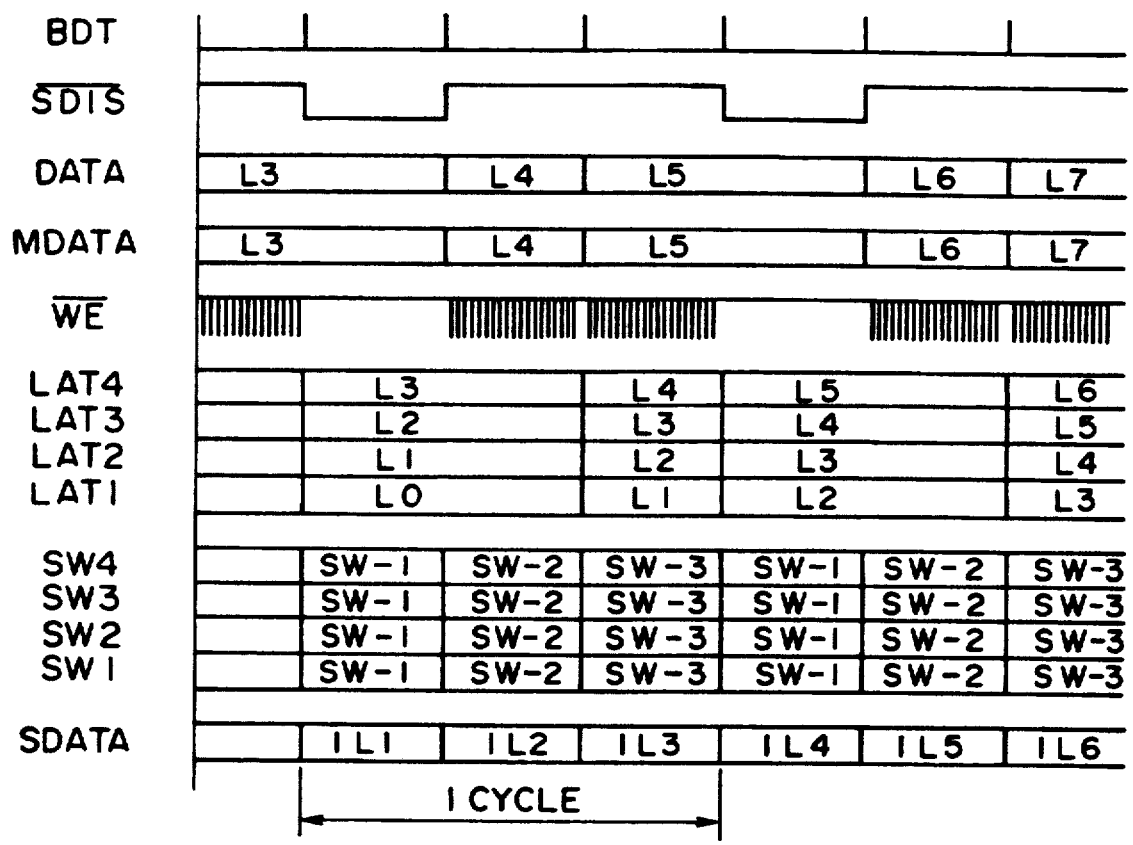
FIG. 11 is a timing chart showing signals of the circuit components of the apparatuses in FIG. 8 and the data flows in the sub-scan direction.

FIG. 8 is a block diagram of a data processing apparatus for two-dimensional interpolation when the present invention is applied to a laser beam printer. FIG. 9 is a timing chart for explaining data transfer in the sub-scan direction in the apparatus of FIG. 8, FIG. 10 shows signals from the respective circuit components in the main-scan direction and the data flows, and FIG. 11 is a timing chart showing the signals of the respective circuit components in the sub-scan direction and the data flows.

Figure 8B:
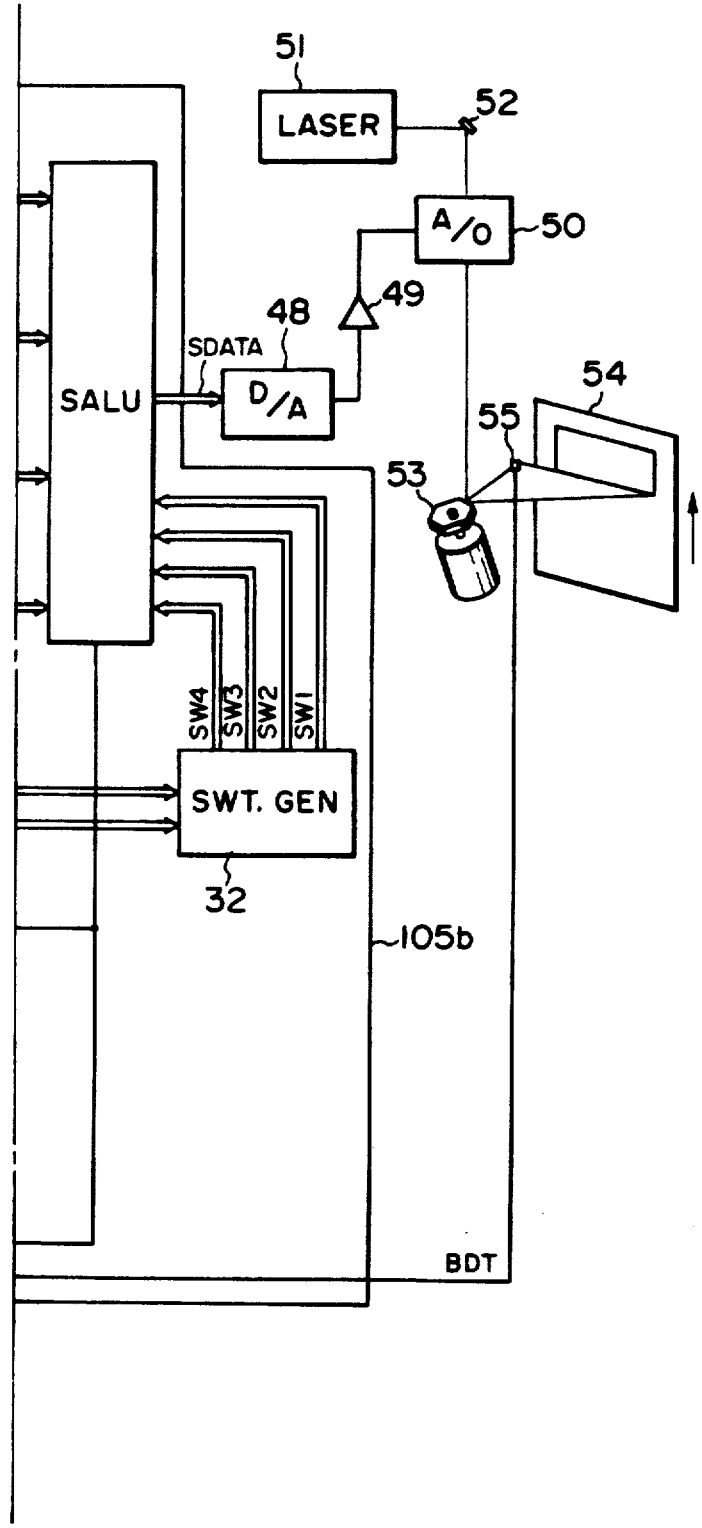

A memory 20 shown in FIGS. 8(a) and 8(b) stores two-dimensional (matrix) data written by a means (not shown). Since the data is read out by raster scanning in the main- and sub-scan directions, a main-scan address counter (MADDR COUNTER) 21 and a sub-scan address counter (SADDR COUNTER) 22 are arranged in the laser beam printer. The laser beam printer also includes main-scan control signal generator (MDIS GEN) 23, a main-scan counter (MCOUNTER) 24, and a main-scan weighting generator (MWT GEN) 27. The address counter 21, the control signal generator 23, the counter 24, and weighting generator 27 are respectively the same as the address counter 2, the control signal generator 3, the counter 4, and the weighting generator 7 in FIG. 1. However, the main-scan address counter 21 is reset in response to a main-scan sync signal, i.e., a signal BDT generated every main-scan line. The sub-scan address counter 22 counts pulses of the signal BDT and designates a sub-scan address of the memory 20. The laser beam printer further includes a gate circuit 25, an inverter 26, and a shift register 28, all of which are respectively the same as the gate circuit 5, the inverter 6, and the shift register 8. A main-scan arithmetic and logic unit (MALU) 29 is the same as the arithmetic logic unit 100 in FIG. 1. The operation in the main-scan direction is the same as that of FIG. 1, and a detailed description thereof will be omitted. The same description concerning the timing chart (FIG. 10) as in FIG. 2 will also be omitted.

The two-dimensional arithmetic operations are performed such that the operations in the main-scan direction and then those in the sub-scan direction are performed. For the sake of simplicity, a case will be exemplified for $2 \times 2 = 4$ points. Data of four points are defined as $Pi,j$, $Pi+1,j$, $Pi,j+1$, and $Pi+1,j+1$ in a matrix form. Weighting coefficients to be respectively multiplied with these data are defined as $We \times Wm$, $We+1 \times Wm$, $We \times Wm+1$, and $We+1 \times Wm+1$. An output I is given as follows:

$$I = We \cdot Wm \cdot Pi,j + We+1 \cdot Wm \cdot Pi+1,j \\ + We \cdot Wm+1 \cdot Pi,j+1 + We+1 \cdot Wm+1 \cdot Pi+1,j+1 \quad (25)$$

where i and j are positions in the main-scan direction and e and m are positions in the sub-scan direction. Equation (25) can be separated in the following manner according to matrix calculations:

$$I = [Wm, Wm + 1] \times \quad (26)$$
$$\begin{bmatrix} We \cdot Pi,j + We+1 \cdot Pi+1,j \\ We \cdot Pi,j+1 + We+1 \cdot Pi+1,j+1 \end{bmatrix}$$

The second term of the right-hand side of equation (26) is the results of arithmetic operations in the main-scan direction. It is thus apparent that data is weighted in the main-scan direction and then in the sub-scan direction. This applies to any case regardless of the number of reference data, i.e., the matrix size.

Identical circuits can be used for main- and sub-scan operations. Therefore, in order to perform arithmetic operations in the sub-scan direction, the arithmetic operation result of one main-scan line must be stored. Assume that the same shift register as the shift register 28 is used, that the number of data after interpolation in the main-scan direction is 4,000, and that each data is 8-bit data. 32,000 ($=8 \times 4,000$) shift registers are required. As described with reference to FIG. 1, 16,000 ($=4,000 \times 4$) latches are required. Even if a highly integrated IC is used, a shift register or latch having a capacity of 128 ($=4,000 \times 8 \times 4$) kbits and 40 ($=8+8 \times 4$) input/output terminals or pins is required. Therefore, in this embodiment, a conventional RAM is used. Commercially available large-capacity static RAMs have a large number of address pins. In order to reduce the number of pins, the data terminal serves as an I/0 terminal. Static RAMs (LM1, LM2, LM3, and LM4) 35 to 38 serving as line memories are controlled such that inputs thereto are set by tristate buffers 43 to 46 at a high impedance. When data are input to the static RAMs 35 to 38, no output data is obtained. The output data from the static RAMs 35 to 38 are latched by the latches (LAT1, LAT2, LAT3, and LAT4) 39 to 42, respectively. More specifically, the data are output from the static RAMs 35 to 38 and are latched by the latches 39 to 42. Thereafter, the data are input from the tristate buffers 43 to 46 to the static RAMs 35 to 38 during one clock pulse of the clock signal CP.

After the line memory address counter 34 is reset in response to the signal BDT, counts pulses of the clock signal CP, and generates a main-scan address signal. The main-scan address counter 21 is similar to the line memory address counter 34. However, the static RAMs 35 to 38 store the interpolated data, so that the count of the line memory address counter 34 is larger than that of the main-scan address counter 21. In the same manner as in the shift register 28, the oldest line data is stored in the static RAM 35 and the newest line data is stored in the static RAM 38. The data is transferred to the static RAMs 38, 37, 36, and 35 in the order named. Therefore, the same transfer control as in the main-scan direction is required in the sub-scan direction. A sub-scan control signal generator (SDIS. GEN) 30 and a sub-scan counter (SCOUNTER) 31 correspond to the main-scan control signal generator 23 and the main-scan counter 24, respectively, except that the generator 30 and the counter 31 are clocked in response to the signal BDT in place of the signal CP. An output from the sub-scan counter 31 controls a sub-scan weighting generator (SWT. GEN) 32 having the same arrangement as that of the main-scan weighting generator 27. An output $\overline{SDIS}$ from the sub-scan control signal generator 30 controls the sub-scan address counter 22 in the same manner as an output $\overline{MDIS}$ from the main-scan control signal generator 23 which controls the main-scan address counter 21. In order to control data transfer from the static RAMs 35 to 38, the signal $\overline{SDIS}$ controls a write signal $\overline{WE}$ output from a sub-scan transfer controller (SCON) 33. The controller 33 mainly includes delay and gate circuits. The controller 33 receives the clock signal CP and the signal $\overline{SDIS}$ and generates the write signal $\overline{WE}$. The controller 33 delays the clock signal CP to generate a clock signal DCP to be latched by the latches 39 to 42 after the outputs from the static RAMs to 38 are determined.

Timing Chart

Data transfer of the static RAMs 35 to 38 will be described with reference to a timing chart of FIG. 9. Data LADDR is counted at the leading edge of the clock signal CP. In this case, the write signal $\overline{WE}$ is set at high level, and the outputs from the tristate buffers to 46 are kept at a high impedance. Data are respectively read out from the static RAMs 35 to 38. Since the output data are slightly delayed, the clock signal CP is delayed or the output data are confirmed in accordance with the delayed clock signal DCP. The output data are then latched by the latches 39 to 42, respectively. When the write signal $\overline{WE}$ goes to low level after the output data are latched by the latches to 42, the static RAMs 35 to 38 are set in the input mode. The outputs from the tristate buffers 43 to 46 are enabled, and an output MDATA from the main-scan arithmetic and logic unit 29 is input to the static RAM 38 at the same address as that of the unit 29. An output from the tristate buffer 42, i.e., the data stored in the static RAM 38 is stored in the static RAM 37 at the same address as that of the static RAM 38. Similarly, data from static RAMs 37 and 36 are respectively stored in the static RAMs 36 and 35. During data storage, the data input to a sub-scan arithmetic and logic circuit (SALU) 47 is kept latched by the latches 39 to 42 and is always definite.

The sub-scan arithmetic and logic unit 47 is the same as those of the main-scan arithmetic and logic unit 29 and the arithmetic and logic unit 100 in FIG. 1. The operation of the sub-scan arithmetic and logic unit 47 is the same as that in FIG. 1, and a detailed description thereof will be omitted. Outputs SW1 to SW4 from the sub-scan weighting generator 32 are kept unchanged within one main scanning period, as shown in FIG. 10. Transfer control in the sub-scan direction is performed by disabling the write signal $\overline{WE}$ by the signal $\overline{SDIS}$ when no transfer is performed, as shown in FIG. 11. Since the static RAMs 35 to 38 are accessed such that data is read out and then transferred, the transferred line is subjected to read access in the next line and to interpolation operations. As is also apparent from FIG. 10, the sub-scan address data is delayed from the main-scan address data, and therefore the address signal from the line memory address counter 34 must be delayed by a predetermined time from the address signal from the main-scan address counter 21. This can be easily achieved such that the line memory address counter 34 is reset by delaying the signal BDT.

An output SDATA from the sub-scan arithmetic and logic circuit 47 represents operation results of two-dimensional interpolation, as described with reference to equations (25) and (26). This digital output is converted by a D/A converter 48 into an analog signal, and the analog signal is amplified by an amplifier 49. The amplified signal drives an AO modulator 50 (ultrasonic optical modulation element). A laser beam from a laser 51 is intensity-modulated by the AO modulator 50 through a mirror 52 in accordance with an output signal from the amplifier 49. A film 54 is scanned by a rotary polygonal mirror 53 with the intensity-modulated laser beam in the main-scan direction. The film 54 is moved by a film moving mechanism (not shown) in the sub-scan direction indicated by the arrow. A latent image is formed on the film 54 in accordance with the data obtained by interpolating two-dimensional data stored in the memory 20. Some laser beams from the rotary polygonal mirror 53 are detected by a photosensor 55 and a detected signal serves as the main-scan sync signal BDT. As described above, the signal BDT is used for resetting in the main-scan direction and counting in the sub-scan direction.

The rotary polygonal mirror 53 may be replaced with another medium such as electrophotographic photosensitive body. If the medium is sensitive to a semiconductor laser, the AO modulator 50 can be omitted. In this case, the output from the amplifier 49 directly drives the laser. The present invention is not limited to the laser printer, but the laser printer may be replaced with an ink-jet printer or the like. Since a small time margin is assured in the sub-scan direction, the sub-scan control signal generator 30 and the sub-scan counter 31 may be replaced with computer software. The AO modulator 50 and the film 54 have nonlinear characteristics with respect to the inputs in FIG. 8. Normally, a look-up table is arranged between the sub-scan arithmetic and logic unit 47 and the D/A converter 48 to correct their nonlinear characteristics.

In the above description, the pipeline operation unit 105 performs one- and two-dimensional data interpolation operations. However, the pipeline operation unit 105 may perform interpolation of three or more dimensions. For example, when information of man's action is stored in a memory to cause a robot to perform a simulation, three-dimensional data even for finger-tip motion must be stored for a long period of time, and a large number of data must be accumulated. In general, such data is compressed, and the compressed data is stored in the memory. When the compressed data is output, it is interpolated. In this case, the sampling frequency can be decreased to reduce the number of data. The pipeline operation unit 105 is also effective for the above operation.

As described above, interpolation processing performed by the conventional computer can be performed by the pipeline operation unit 105 in the following manner. The pipeline operation unit 105 comprises a control signal generator for controlling data flows. The data flow input to the arithmetic and logic unit or output therefrom is controlled to change a magnification for the data flow. Without using a large-capacity memory, high-speed or real-time interpolation processing can be performed at an arbitrary magnification. The present invention can be effectively applied to filter processing or the like in addition to interpolation processing.

The pipeline operation unit 105 can use any interpolation magnification theoretically. However, the scale of hardware is increased depending on various interpolation magnifications. It is more advantageous to limit the number of interpolation magnifications in practice. For this reason, when the pipeline arithmetic and logic unit is used for interpolation processing, the range of interpolation magnifications is limited. Therefore, a conventional method of determining the interpolation magnification cannot be employed. In the conventional method, in order to determine the interpolation magnification, a sum of spaces between the images from the beginning to the end is fixed. This method is not so advantageous due to the following reason. If the sum of spaces obtained by an interpolation at a given interpolation magnification is slightly smaller than the fixed value, the lower interpolation magnification by only one step must be selected. The space between the images to be recorded is excessively large, and the size of the output image is excessively small. The output result is disadvantageous in effective utilization of the output medium.

Method of Limiting Range of Interpolation Magnifications

An optimal method of limiting the range of interpolation magnifications will be described below.

Assume that the number of interpolation magnifications is excessively small. If the magnification is an integer multiple so as to enlarge the image by an interpolation, the area is the square of the interpolation magnification. In other words, the area magnifications are given as 1, 4, 9, 15, .... The enlargement ratios in units of steps are 4/1, 2.25/1, 1.78/1, .... When the enlargement ratio for the original image is low, the enlargement ratio per step is increased, resulting in inconvenience.

It is ideal that the magnification ratio per step is predetermined regardless of changes in interpolation magnifications. When the interpolation magnification is represented by a fraction, minimum hardware must repeat a sequence, the number of which corresponds to the value of a numerator. For example, if the magnification ratio is 1.1 : 1 as a predetermined value, the interpolation magnifications are 1, 1.1, 1.21, 1.331, .... The magnification of 1.1 is represented by a fraction 11/10. However, the magnifications of 1.21 and 1.331 are represented as fractions 121/100 and 1331/1000, respectively. Therefore, hardware must repeat the sequences corresponding to the numerators. This repetition operations are performed by a counter circuit, and therefore the size of the counter circuit is greatly increased. The capacity of the memory for storing weighting coefficients used for interpolation processing, as previously described, is increased accordingly, thus resulting in an impractical application. Therefore, the magnification ratio per step must fall within the predetermined range.

Assume that an interpolation magnification is a value obtained by multiplying an integer train of a given system with a fraction train each fraction of which is larger than 1. In this case, an interpolation magnification $Mn,k$ is given as follows:

$$Mn,k = B^n \times k/L \tag{22}$$

where B and L are constants in which B is a positive integer and L is a positive integer of 2 or more, n and k are variables in which n is a positive integer including zero and k is an integer of L or more and of less than $B \times L$, $B^n$ is an integer train, and $k/L$ is a fraction train.

When a magnification ratio per step is given as R, its maximum and minimum values RMAX and RMIN are given as follows:

$$RMAX = Mn,L + 1/Mn,BL - 1 = BL/(BL-1)$$
$$= Mn,L + 1/Mn,L = (L+1)/L \tag{23}$$

$$RMIN = Mn + 1,L/Mn,BL - 1 = BL/(BL-1) \tag{24}$$

The above values are not influenced by the value n.

In other words, if the interpolation magnification is given by equation (22), the ratio R is changed between $B^n$ and $B^{n+1}$. However, if k is kept unchanged, the ratio R is constant even if the value n is changed. Even is the interpolation ratio is greatly changed, the magnification ratio per step is not so changed. As is apparent from equation (23), the maximum value RMAX is determined by the value of L. In this case, when the value of the ratio L is increased, the maximum value RMAX is decreased. The number of repetition cycles of hardware is determined by the numerator. When the value of $(B \times L)$ is increased, the types of repetition cycles are increased, and at the same time, the cycle is prolonged, resulting in bulky hardware. The constants B and L are preferably small. If B is 1, $B^n$ is always 1, so that equation (22) provides an interpolation magnification between 1 (inclusive) and 2 (exclusive). If a 2-time interpolation is performed or more, the minimum value is 2.

A simple interpolation magnification can be obtained when L is a power of B, as represented by:

$$L = B^C \tag{25}$$

where C is a positive integer. A substitution of equation (25) into equation (22) yields the following:

$$Mn,k = B^{(N-c)} \times k \tag{26}$$

The interpolation magnifications are given as integers for $n \geq c$. If the interpolation magnification is an integer, the number of repetition cycles is an integer. As is apparent from equation (24), the minimum value RMIN is increased when the value B is small, thereby reducing a difference between the maximum and minimum values RMAX and RMIN. Therefore, B=2 and hence L=$2^C$ are preferable.

When the image data are interpolated for enlargement, as previously described, the area magnification is the square of Mn,k. The maximum and minimum values of the enlargement ratio per step are the squares of RMAX and RMIN, respectively. If the enlargement ratio of the area per step is given as S, its maximum and minimum values are given as follows:

$$SMAX = (RMAX)^2 = \{(L+1)/L\}^2 \quad (27)$$

$$SMIN = (RMIN)^2 = \{BL/(BL-1)\}^2 \quad (28)$$

When the maximum value SMAX is determined, the value L is determined. FIG. 26(A) shows conditions for L when the value S is changed within the allowance and the minimum L value satisfying the conditions.

Condition SMAX ≤ 1.05 in FIG. 26(A) indicates that the area enlargement ratio per step is given as 5% or less. The value L is preferably a power of 2. The maximum value SMAX for L as a power of 2 is shown in FIG. 26(B). Differences between the maximum values SMAX are shown in the rightmost column. Equation (27) shows an asymptote representing that the maximum value SMAX comes close to 1 when the value L is increased. The rate of decrease in SMAX is lowered when the value L is increased. An allowable maximum value SMAX varies depending on the purposes and individual judgements. L=8 or 16 is practical in consideration of the scale of hardware.

Substitutions of B=2 and L=8 into equation (22) yield the following:

$$Mn,k = 2^n \times k/8 \quad (29)$$

If n ≥ 3, i.e., the interpolation magnification is 8 or more, it is an integer multiple.

Substitutions of B=2 and L=8 into equation (28) yield the following relation:

$$SMIN = 1.13 \quad (30)$$

The area enlargement ratio per step is changed within the range of 13% to 27%.

If B=2 and L=8, then the following relations are derived from equations (23) and (24):

$$RMAX = 1.13 \quad (31)$$

$$RMIN = 1.06 \quad (32)$$

The enlargement ratio per step in one-dimensional interpolation is increased within the range of 6% to 13%.

In order to interpolate the image, the interpolation magnification calculation represented by equation (22) is performed according to a matrix calculation, thereby expanding the operation to two-dimensional interpolation.

In two-dimensional interpolation, calculations can be performed at different magnifications, thereby changing magnifications in the main- and sub-scan directions.

FIG. 26(C) shows an interpolation magnification if n ≤ 3 is given in equation (29). The interpolation magnification shown in FIG. 6 and the signal DIS correspond to the interpolation magnification of FIG. 26(C). As is omitted in this embodiment, the number of weighting coefficients for the interpolation magnifications is 64 (=4×16). If a magnification which satisfies the above equation in accordance with changes in interpolation magnification, the value corresponding to 16 clocks as the period of the signal $\overline{DIS}$ and 64 weighting coefficients are changed. Therefore, the size of hardware can be reduced.

As described above, the data processing apparatus including the pipeline operation unit can perform high-speed or real time interpolation without using a large-capacity memory, unlike in conventional image interpolation performed by a computer. At the same time, the interpolation magnification can be selected without greatly changing the one-to-one magnification ratio. In the image processing apparatus using this pipeline operation unit, in addition to the above effect, an optimal interpolation magnification can be selected from the limited interpolation magnifications on the basis of input image information and an output image format information. In addition, the space outside the image can be set, and therefore the image area on the recording medium can be effectively utilized.

According to the present invention, there is provided an image processing apparatus wherein a large-capacity memory is not required, high-speed or real-time image interpolation can be performed, the output medium area occupied by the image can be increased, the output image can be readily visually recognized, and cost performance can be improved.

According to the present invention, there is provided a pipeline data processing apparatus wherein a large-capacity memory is not required, high-speed or real-time interpolation can be performed, and an interpolation magnification can be selected without greatly changing one-to-one magnification ratio.

According to the present invention, there is provided a data processing apparatus wherein a large capacity memory is not required and every high-speed or real-time operation can be performed even if input and output data flows differ from each other.

According to the present invention, a large capacity memory is not required, a bus line can be effectively used during data processing, and a blanking period can be effectively utilized for arithmetic operations, thereby obtaining a sufficient processing time margin.

I claim:

1. An image processing apparatus for interpolating an input image and outputting the interpolated input image, said image processing apparatus comprising:
   selecting means for selecting one of a plurality of interpolation magnifications on the basis of an input image pixel count, an output medium pixel count, a designated output image count, and a designated output image layout,
   wherein the plurality of interpolation magnifications are represented by:

$$B^n \times k/L$$

where B and L are constants in which B is a positive integer and L is an integer not less than 2, and n and k are variables in which n is a non-negative integer and k is an integer not less than L and less than B×L;
   interpolating means for performing interpolation operations at the selected magnification, wherein said interpolating means further comprises a signal generator for generating a control signal in response to the selected magnification and means for performing the interpolation operations while controlling the flow of data on the basis of the control signal; and output means for outputting an image interpolated by said interpolating means, in accordance with the designated output image layout, wherein the input image is interpolated at a magnification determined such that a size of an output image falls within an area of an output medium.

2. An apparatus according to claim 1, wherein said selecting means selects a magnification such that the size of the output image or the output image pixel count with respect to the area of the output medium or a pixel count thereof is maximum within a range which does not cause omissions of the output image.

3. An apparatus according to claim 2, wherein said output means performs raster scanning in main- and sub-scan directions, independently calculates main- and sub-scan space pixel counts, which are obtained for spaces outside the input image, on the basis of values obtained by subtracting main- and sub-scan input image pixel counts from reference input pixel counts, the reference input pixel counts being calculated by dividing main- and sub-scan output medium pixel counts by the magnification selected by said selecting means, and independently assigns the main- and sub-scan space pixel counts to spaces outside the input image in the main- and sub-scan directions.

4. An apparatus according to claim 3, wherein space pixels and single lines of a plurality of input images along the main-scan direction are written in a line memory, and data written in said line memory is interpolated.

5. An apparatus according to claim 1, wherein at least two sizes of the output medium are provided.

6. An apparatus according to claim 1, wherein said interpolating means comprises a pipeline operating means and said interpolating means is constructed and arranged to select a plurality of interpolation modes.

7. An apparatus according to claim 6, wherein the plurality of interpolation modes comprise a cubic spline interpolation and a nearest neighbor interpolation.

8. An apparatus according to claim 1, wherein said output means comprises a laser beam printer.

9. An apparatus according to claim 1, wherein said output medium comprises a photosensitive silver chloride film.

10. An apparatus according to claim 1, wherein said output medium comprises paper.

11. An apparatus according to claim 1, wherein the image comprises a halftone image.

12. An apparatus according to claim 1, wherein the magnification includes magnifications of non-integer multiples.

13. An apparatus according to claim 1, wherein the interpolation operation is one of a cubic spline interpolation, a linear interpolation, and a nearest neighbor interpolation.

14. An image processing apparatus for processing a plurality of dimensional data according to a pipeline scheme, comprising:

designating means for designating an interpolation magnification represented by:

$$B^n \times k/L$$

where B and L are constants in which B is a positive integer and L is an integer not less than 2, and n and k are variables in which n is a non-negative integer and k is an integer not less than L and less than $B \times L$;

input means for inputting data at a timing corresponding to the interpolation magnification designated by said designating means;

operating means for performing an interpolation at the interpolation magnification on the basis of a plurality of data input at said input means, wherein said operating means further comprises a signal generator for generating a control signal in response to the designated magnification and means for performing the interpolation while controlling the flow of data on the basis of the control signal;

output means for outputting results of operations by said operating means, continuously at a given timing; and control means for matching a data flow in said input means with a data flow in said output means.

15. An apparatus according to claim 14, wherein L is a power of B.

16. An apparatus according to claim 15, wherein B =2 and L=8.

17. An apparatus according to claim 14, wherein the data is two-dimensional image data, and said operating means comprises two identical circuit arrangement which are combined to perform two-dimensional interpolation.

18. An apparatus according to claim 17, wherein two-dimensionally interpolated data is displayed or recorded.

19. An apparatus according to claim 14, wherein the image comprises a halftone image.

20. An apparatus according to claim 14, wherein the magnification includes magnifications of non-integer multiples.

21. An apparatus according to claim 14, wherein the interpolation operation is one of a cubic spline interpolation, a linear interpolation, and a nearest neighbor interpolation.

22. An image processing apparatus for processing image data according to a pipeline scheme, comprising:

input means for inputting the image data at a first time-serial timing;

pipeline-operating means for performing predetermined operations on the basis of a plurality of data input at said input means, wherein said pipeline-operating means further comprises a signal generator for generating a control signal and means for performing the predetermined operations while controlling the flow of data on the basis of the control signal;

output means including a raster scanning output device for outputting results obtained by said pipeline-operating means, continuously at a second time-serial timing different from the first time-serial timing; and control means for matching the first and second time-serial timings.

23. An apparatus according to claim 22, wherein the data to be processed is sampled data, and an input sampled data has a frequency different from that of output data.

24. An apparatus according to claim 22, wherein said operating means comprises a weighting multiplier for freely changing a weighting coefficient.

25. An apparatus according to claim 24, wherein said operating means performs data interpolation.

26. An apparatus according to claim 22, wherein the second time-serial timing is given in a predetermined cycle.

27. An apparatus according to claim 22, wherein the image comprises a halftone image.

28. An image processing apparatus for processing image data according to a pipeline scheme, comprising:
- input means for inputting the image data at a first time-serial timing;
- pipeline-operating means for performing predetermined operations on the basis of a plurality of data input at said input means, wherein said pipeline-operating means further comprises a signal generator for generating a control signal and means for performing the predetermined operations while controlling the flow of data on the basis of the control signal;
- output means including a raster scanning output device for outputting results obtained by said pipeline-operating means, continuously at a second time-serial timing different from the first time-serial timing;
- control means for matching the first and second time-serial timings; and
- designating means for programmably designating operations of said input means, said pipeline-operating means, said output means, and said control means.

29. An apparatus according to claim 28, wherein the data to be processed is sampled data, and an input sampled data has a frequency different from that of output data.

30. An apparatus according to claim 28, wherein the second time-serial timing is given in a predetermined cycle.

31. An apparatus according to claim 28, wherein the image comprises a halftone image.

32. An image processing apparatus for processing image data according to a pipeline scheme, said apparatus comprising:
- a memory means for storing the image data;
- a direct memory access controller for controlling access to said memory means of data at independent timings;
- a pipeline operation unit for accessing the data at independent timings according to the pipeline scheme, wherein said pipeline-operation unit further comprises a signal generator for generating a control signal and means for performing predetermined operations while controlling the flow of data on the basis of the control signal;
- a data output section including a raster scanning output device for outputting the accessed data continuously at independent timings;
- a first pair of buffers for connecting said direct memory access controller and said pipeline operation unit; and
- a second pair of buffers for connecting said pipeline operation unit and said data output section.

33. An apparatus according to claim 32, wherein said pipeline operating unit performs sample data interpolation.

34. An apparatus according to claim 32, wherein said data output section comprises a display unit.

35. An apparatus according to claim 32, wherein said data output section comprises a printer.

36. An apparatus according to claim 32, wherein the data is n-dimensional image data.

37. An apparatus according to claim 32, wherein the image comprises a halftone image.

38. An image processing apparatus for processing image data according to a pipeline scheme, said apparatus comprising:
- selecting means for selecting one of a plurality of interpolation magnifications on the basis of an input image pixel count, an output medium pixel count, a designated output image count, and a designated output image layout;
- input means for inputting the image data at a first time-serial timing;
- pipeline-operating means for performing an interpolation operation at the selected interpolation magnification on the basis of a plurality of data input at said input means, wherein said pipeline-operating means further comprises a signal generator for generating a control signal in response to the selected magnification and means for performing the interpolation operation while controlling the flow of data on the basis of the control signal;
- output means including a raster scanning output device for outputting results obtained by said pipeline-operating means, continuously at a second time-serial timing different from the first time-serial timing; and
- control means for matching a data flow in said input means with a data flow in said output means.

39. An apparatus according to claim 38, wherein the image comprises a halftone image.

40. An apparatus according to claim 38, wherein the magnification includes magnifications of non-integer multiples.

41. An apparatus according to claim 38, wherein the interpolation operation is one of a cubic spline interpolation, a linear interpolation, and a nearest neighbor interpolation.

42. An image processing apparatus for processing two-dimensional image data according to a pipeline scheme, comprising:
- setting means for setting an image magnification on the basis of an input image pixel count, an output medium pixel count, a designated output image count, and a designated output image layout;
- input means for inputting the image data at a first time-serial timing;
- pipeline-operating means for performing interpolation operations on the basis of a plurality of data input at said input means, wherein said pipeline-operating means includes operating means for operations in a main-scan direction, operating means for operations in a sub-scan direction and operation control means for controlling data flow in said main-scan and sub-scan direction operating means in response to the image magnification set by said setting means, wherein said pipeline-operating means further comprises a signal generator for generating a control signal in response to the set magnification and means for performing the interpolation operations while controlling the flow of data on the basis of the control signal;
- output means including a raster scanning output device for outputting results obtained by said pipeline-operating means, continuously at a second time serial timing different from the first time-serial timing; and
- control means for matching the first and the second time-serial timings.

43. An apparatus according to claim 42, wherein the image comprises a halftone image.

44. An apparatus according to claim 42, wherein the magnification includes magnifications of non-integer multiples.

45. An apparatus according to claim 42, wherein the interpolation operation is one of a cubic spline interpolation, a linear interpolation, and a nearest neighbor interpolation.

* * * * *

UNITED STATES PATENT AND TRADEMARK OFFICE
CERTIFICATE OF CORRECTION

PATENT NO. : 5,202,670
DATED : April 13, 1993
INVENTOR(S) : SHINICHI OHTA It is certified that error appears in the above-identified patent and that said Letters Patent is hereby corrected as shown below:

On the title page,
<u>AT [19] USP</u>

"Oha" should read --Ohta--.

<u>AT [75] INVENTOR</u>

"Shinichi Oha," should read --Shinichi Ohta,--.

<u>COLUMN 2</u>

Line 3, "magnification" should read --magnification,--.
    Line 32, "50% the" should read --50% of the--.

<u>COLUMN 3</u>

Line 10, "another" should read --one--.
    Line 46, "another" should read --one--.
    Line 47, "to provide" should read --is provided--.

<u>COLUMN 4</u>

Line 43, "with" (second occurrence) should read --of--.

<u>COLUMN 5</u>

Line 8, "diagram" should read --diagrams--.

<u>COLUMN 9</u>

Line 38, "has been" should read --however--.
    Line 41, "six" should read --six images--.

UNITED STATES PATENT AND TRADEMARK OFFICE
CERTIFICATE OF CORRECTION

PATENT NO. : 5,202,670
DATED : April 13, 1993
INVENTOR(S) : SHINICHI OHTA It is certified that error appears in the above-identified patent and that said Letters Patent is hereby corrected as shown below:

COLUMN 15

Line 6, "interplated" should be deleted.
    Line 18, "show" should read --shows--.
    Line 19, "show" should read --shows--.

COLUMN 19

Line 9, "led" should be deleted.

COLUMN 23

Line 11, "BDT, counts" should read --BDT, it counts--.
    Line 53, "to" should read --43 to--.
    Line 61, "to 42," should read --39 to 42,--.

COLUMM 26

Line 6, "This" should read --These--.
    Line 39, "is" (third occurrence) should read --if--.

COLUMN 28

Line 63, "BXL:" should read --BXL;--.

UNITED STATES PATENT AND TRADEMARK OFFICE
CERTIFICATE OF CORRECTION

PATENT NO. : 5,202,670

DATED : April 13, 1993

INVENTOR(S) : SHINICHI OHTA

It is certified that error appears in the above-identified patent and that said Letters Patent is hereby corrected as shown below:

COLUMN 30

Line 25, "arrangement" should read --arrangements--.

Signed and Sealed this

Twenty-third Day of November, 1993

Attest:

BRUCE LEHMAN

Attesting Officer

Commissioner of Patents and Trademarks